United States Patent
Tsuchiya et al.

(10) Patent No.: US 6,980,326 B2
(45) Date of Patent: *Dec. 27, 2005

(54) IMAGE PROCESSING METHOD AND APPARATUS FOR COLOR CORRECTION OF AN IMAGE

(75) Inventors: Okinori Tsuchiya, Yokohama (JP); Makoto Torigoe, Tokyo (JP); Shigeyasu Nagoshi, Yokohama (JP); Manabu Yamazoe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 875 days.

This patent is subject to a terminal disclaimer.

(21) Appl. No.: 09/734,021

(22) Filed: Dec. 12, 2000

(65) Prior Publication Data

US 2001/0052971 A1 Dec. 20, 2001

(30) Foreign Application Priority Data

Dec. 15, 1999 (JP) .......................... 11-356197
Dec. 27, 1999 (JP) .......................... 11-369475

(51) Int. Cl.[7] .............................................. G06K 15/00
(52) U.S. Cl. ...................................... 358/1.9; 358/518
(58) Field of Search ................ 358/1.9, 3.07, 358/518, 519, 520, 521, 516, 530, 532; 382/1.74, 1.67, 162, 264, 167

(56) References Cited

U.S. PATENT DOCUMENTS 4,775,888 A * 10/1988 Nakagawa et al. ......... 348/702
5,010,515 A * 4/1991 Torborg, Jr. ................ 345/505
5,432,869 A 7/1995 Matsumoto et al. ........ 382/274
5,477,345 A * 12/1995 Tse ............................ 358/500
5,541,668 A * 7/1996 Kuwahara et al. .......... 348/624
5,742,410 A * 4/1998 Suzuki ....................... 358/518
5,757,375 A * 5/1998 Kawase ...................... 345/613
5,828,815 A * 10/1998 Herregods et al. .......... 358/1.9

FOREIGN PATENT DOCUMENTS

| EP | 0843464 | 5/1998 | ............ H04N/1/60 |
| EP | 0920221 A2 | 6/1999 | ............ H40N/9/03 |
| EP | 0920221 A3 | 1/2001 | ............ H04N/9/04 |
| JP | 63-182785 A | 7/1988 | ............ G06F/15/68 |
| JP | 5153608 | 6/1993 | ............ H04N/9/64 |
| JP | 10200777 | 7/1998 | ......... H04N/001/60 |
| JP | 11186937 | 7/1999 | ............ H04B/1/59 |

* cited by examiner

Primary Examiner—Arthur G. Evans
(74) Attorney, Agent, or Firm—Fitzpatrick, Cella, Harper & Scinto

(57) ABSTRACT

An image process method comprises an input step of inputting color image data composed of a signal representing brightness and a signal representing tint, and a smoothing process step of performing a smoothing process to the signal representing tint, while holding the signal representing brightness. Thus, high-level color noise reduction can be performed without deteriorating apparent resolution of an output color image.

37 Claims, 14 Drawing Sheets

FIG. 5

| 1/25 | 1/25 | 1/25 | 1/25 | 1/25 |
|------|------|------|------|------|
| 1/25 | 1/25 | 1/25 | 1/25 | 1/25 |
| 1/25 | 1/25 | (1/25) | 1/25 | 1/25 |
| 1/25 | 1/25 | 1/25 | 1/25 | 1/25 |
| 1/25 | 1/25 | 1/25 | 1/25 | 1/25 |

FIG. 6

| 2/39 | 2/39 | 2/39 | 2/39 | 2/39 |
|------|------|------|------|------|
| 2/39 | 2/39 | 2/39 | 2/25 | 2/39 |
| 2/39 | 2/39 | (3/39) | 1/39 | 1/39 |
| 1/39 | 1/39 | 1/39 | 1/39 | 1/39 |
| 1/39 | 1/39 | 1/39 | 1/25 | 1/39 |

FIG. 7

| 2/41 | 2/41 | 2/41 | 2/41 | 2/41 |
|------|------|------|------|------|
| 2/41 | 1/41 | 1/41 | 1/41 | 2/41 |
| 2/41 | 1/41 | (1/41) | 1/41 | 2/41 |
| 2/41 | 1/41 | 1/41 | 1/41 | 2/42 |
| 2/41 | 2/41 | 2/41 | 2/41 | 2/41 |

| 2/19 | 2/19 | 2/19 | 2/19 | 2/19 |
|---|---|---|---|---|
| 2/19 | 2/19 | 2/19 | 2/19 | 2/19 |
| 2/19 | 2/19 | 3/19 | 1/19 | 1/19 |

| 2/18 | 2/18 | 2/18 | 2/18 | 2/18 |
|---|---|---|---|---|
| 2/18 | 2/18 | 2/18 | 1/18 | 1/18 |

| 2/5 | 2/5 | 2/5 | 1/5 | 1/5 |
|---|---|---|---|---|

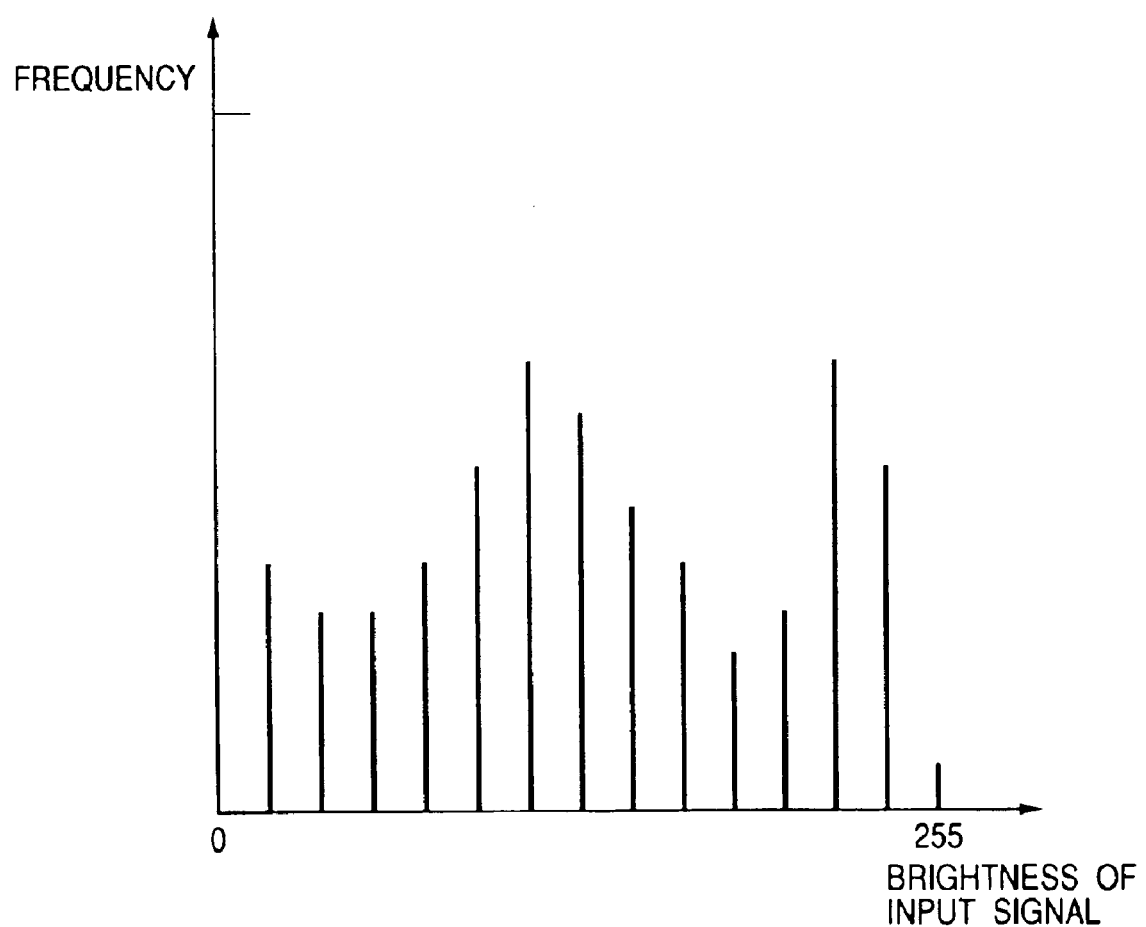

IMAGE PROCESSING METHOD AND APPARATUS FOR COLOR CORRECTION OF AN IMAGE

BACKGROUND OF THE INVENTION

1. Field of the Invention

The present invention relates to an image process method for correcting an image signal, an image process apparatus adopting the above method, and a storage medium storing a program to execute the above method. More particularly, the present invention relates to an image process apparatus for decreasing a color noise, an image process apparatus adopting the above method, and a storage medium storing a program to execute the above method.

2. Related Background Art

In recent years, as hard-copy technology, especially a full-color hard-copy technology, develops, an excellent image reproduction can be achieved by using printing technology such as an inkjet recording system and the like and a high-pixel digital camera. By recording materials and image processes, color reproduction evolves up to extent by which digital photographing provides with an equal reproduction ability with silver bromide photographing.

However, there is a drawback that a color noise due to a characteristic of an image pickup element or the like in an input apparatus might be included in the image itself which should be printed. For example, there is a drawback that a noise due to a dark current in a CCD element, a fixed pattern noise, a noise on a signal line due to color signal transmission, and the like occasionally mix with the input image.

In order to eliminate the above drawback, Japanese Patent Application Laid-Open No. 5-153608 (simply called JPA '608: corresponding to U.S. Pat. No. 5,432,869) describes that, by obtaining an average of upper and lower dye data adjacent to a notable pixel along the vertical direction, the dye data is subjected to smoothing filtering in the vertical direction without deteriorating image brightness.

Further, JPA '608 describes that, by detecting the correlation of the brightness of continuous three pixels along the vertical direction, an edge part where a change in the brightness along the vertical direction is extreme according to the correlation of the brightness is considered to be the part where also a change in the dye data is large, and thus the smoothing filtering is decreased for such the part. Conversely, when the change in the brightness along the vertical direction is small, the smoothing filtering is increased. Further, JPA '608 describes a method for expanding, by repeating an operation to obtain the above average for the notable pixel several times, the smoothing for the dye data along the vertical direction with simple structure.

However, when such the conventional color noise elimination as above is applied to an image signal, apparent (or seeming) resolution of texture on the image not detected easily only by the edge from the brightness signal might be deteriorated. Further, when chromaticity of an attentional color noise is greatly different from surrounding chromaticity, there is a problem that it is necessary to repeat a color noise elimination process several times for the notable pixel.

In recent years, from the viewpoint of desirable color reproduction, an input image is first analyzed by a printer driver or the like, and processes such as brightness correction, saturation (or chroma) emphasis and the like are performed to the input image itself in accordance with the analysis result. For example, Japanese Patent Application Laid-Open No. 10-200777 describes that an image is first analyzed, and then a process for appropriate saturation correction is performed.

Further, when an image taken by a low-pixel digital camera is printed, such the printed image might be overshadowed by the printed image taken by the above high-pixel digital camera, whereupon a method of enlarging or expanding the input image to a suitable size by using anti-aliasing technique such as a bicubic manner, a nearest neighbor manner or the like is known.

Further, the noise such as the color noise or the like due to the dark current in the CCD element is included in the digital camera image. In color reproduction based on a subtractive color mixture system used in a hard copying machine, a gray line is very unstable frequently, and gradation is occasionally reversed around the gray line. Thus, since the color which should be originally the gray replaces the color around the gray line because of a color noise, there is a problem that it becomes easy for such the reversal part as above to appear on the printed image.

As a process to reduce the color noise, a color noise reduction process to divide a video signal into a brightness signal and a color difference signal in a TV set and clip the amplitude in the frequency band corresponding to the color noise part of the color difference signal is known.

However, if the image correction processes such as the brightness correction, the saturation emphasis and the like according to the analysis result, the enlargement process and the noise reduction process are combined, following problems are caused.

Namely, since the saturation of the entire image is emphasized according to the image correction processes such as the saturation emphasis and the like, the effect of the color noise reduction process might not be able to be demonstrated about the emphasized color noise part.

Further, since the input image is subjected to the enlargement process, the effect of the color noise reduction process might not be able to be demonstrated about the enlarged color noise part.

SUMMARY OF THE INVENTION

An object of the present invention is to provide an image process method capable of achieving high-level color noise reduction without deteriorating apparent (or seeming) resolution for a color signal, an image process apparatus adopting this method, and a storage medium storing a program to execute this method.

In order to achieve the above object, the present invention provides an image process method comprising: an input step of inputting color image data composed of a signal representing brightness and a signal representing tint; and a smoothing process step of performing a smoothing process to the signal representing tint, while holding the signal representing brightness.

Another object of the present invention is to be able to effectively perform a color noise reduction process, and to be able to effectively perform the color noise reduction process and an image correction process.

In order to achieve the above object, the present invention provides an image process method comprising: a calculation step of calculating a feature quantity of an input image; a color noise reduction process step of performing a color noise reduction process to input image data; and an image correction step of performing a correction process to the input image subjected to the color noise reduction process, on the basis of the calculated feature quantity.

Still another object of the present invention is to be able to effectively perform the color noise reduction process and an image scaling process.

In order to achieve the above object, the present invention provides an image process method comprising: a color noise reduction process step of performing a color noise reduction process for input digital image data; and a scaling step of scaling an image size, wherein the order of the color noise reduction process step and the scaling step is controlled in accordance with a scaling rate or a scaling method.

Other objects and features of the present invention will become apparent from the following detailed description and the attached drawings.

BRIEF DESCRIPTION OF THE DRAWINGS

FIG. 5 is a diagram showing an weight configuration of a low-pass filter;

FIG. 6 is a diagram showing a filter in which higher weight as compared with unprocessed signal values is allocated;

FIG. 7 is a diagram showing a filter in which high weight is allocated to pixels away from a notable pixel;

FIG. 8 is a flow chart showing an operation of the color noise reduction process which additionally includes edge judgment and the like;

FIG. 18 is a diagram showing an example of a brightness histogram in a non-natural image such as a computer graphics (CG) image.

DETAILED DESCRIPTION OF THE PREFERRED EMBODIMENTS

[First Embodiment]

Figure 1:
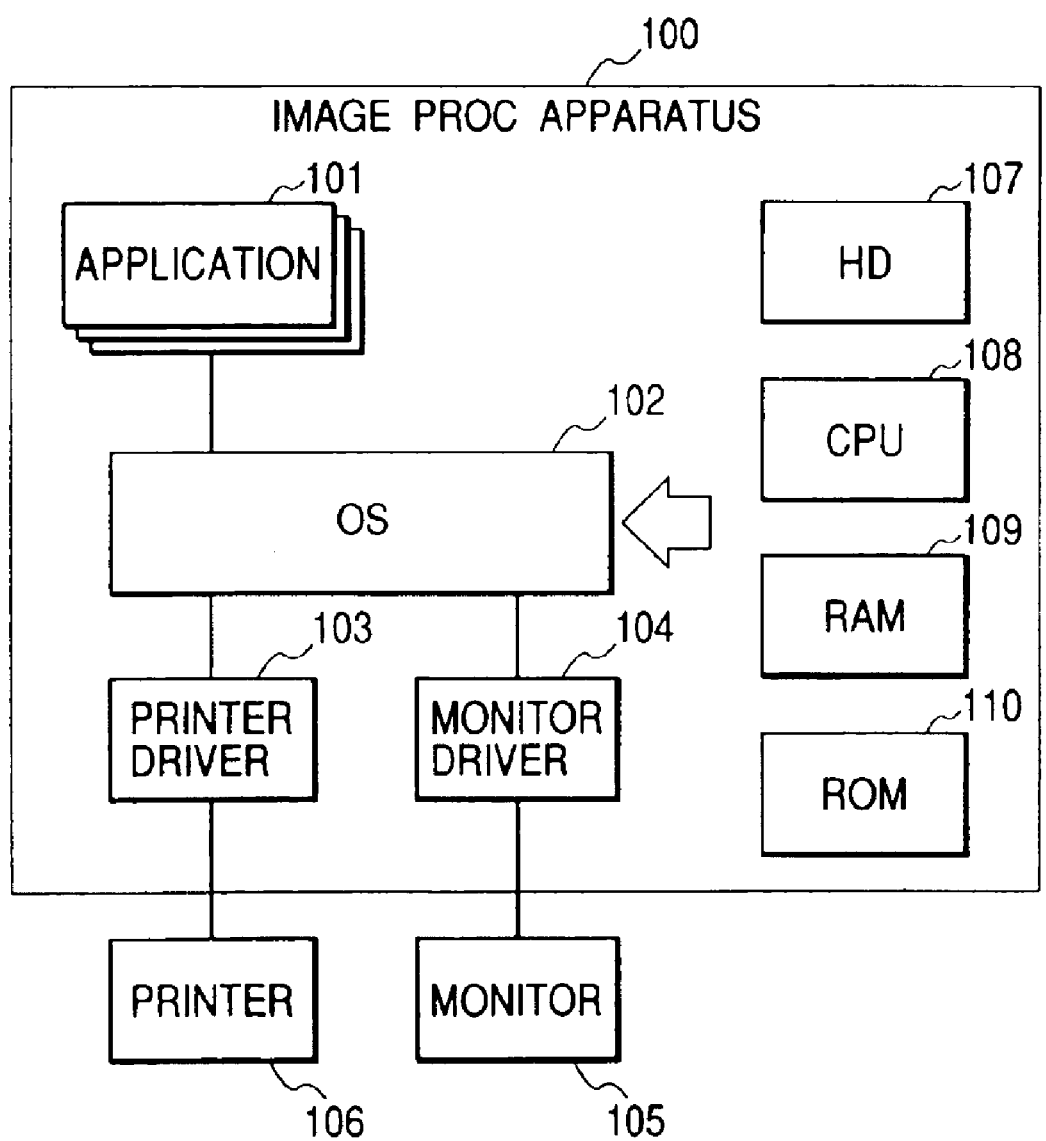
FIG. 1 is a block diagram schematically showing an image process apparatus 100 according to the first embodiment of the present invention.

FIG. 1 is a block diagram schematically showing an image process apparatus 100 according to the first embodiment of the present invention.

For example, a printer 106 such as an inkjet printer or the like and a monitor 105 are connected to the image process apparatus 100 which includes a host computer.

The image process apparatus 100 includes, as software, applications 101 such as a word processor, a spreadsheet program, an Internet browser and the like, an OS (operating system) 102, a printer driver 103 which processes a group of various drawing instructions (an image drawing instruction, a text drawing instruction and a graphics drawing instruction) indicating output images issued to the OS 102 according to the applications and creates printing data, and a monitor driver 104 which processes the group of various drawing instructions and displays them on the monitor 105.

Further, the image process apparatus 100 includes, as various hardware which can execute the above software, a CPU (central process unit) 108, an HD (hard disk driver) 107, a RAM (random-access memory) 109, a ROM (read-only memory) 110, and the like.

As for the image process apparatus 100, for example, an apparatus which uses Windows 95 (TM) of Microsoft Corporation as the OS for a widespread personal computer of AT compatible machine of IBM Corporation and in which arbitrary printable applications have been installed is thought.

In the image process apparatus 100, text data classified to text such as a character or the like, graphics data classified to graphics such as a figure or the like, and image data classified to a natural image or the like which are all created by the application 101 are converted into output image data.

When the output image data is printed and output, a printing output request is issued from the application 101 to the OS 102. By the application 101, the graphics drawing instruction is issued to the OS 102 for the graphic data part, and a group of image drawing instructions indicating the output image is issued to the OS 102 for the image data part.

The output request from the application 101 is received by the OS 102, and the group of drawing instructions is thus issued to the printer driver 103 corresponding to the printer 106. The printing request and the group of drawing instructions input from the OS 102 are processed by the printer driver 103, the output image data capable of being printed at the printer 106 is created and then transferred to the printer 106.

When the printer 106 is a raster printer, in the printer driver 103, an image correction process is performed sequentially to the drawing instructions issued from the OS 102, and the processed drawing instructions are sequentially rasterized to an RGB (red, green and blue) 24-bit page memory. After all the drawing instructions are rasterized, the content of the RGB 24-bit page memory is converted into a data format printable by the printer 106 such as C (cyan), M (magenta), Y (yellow) and K (black) data, and the converted data is then transferred to the printer 106.

Next, the process operation of the printer driver 103 in the present embodiment will be explained.

Figure 2:
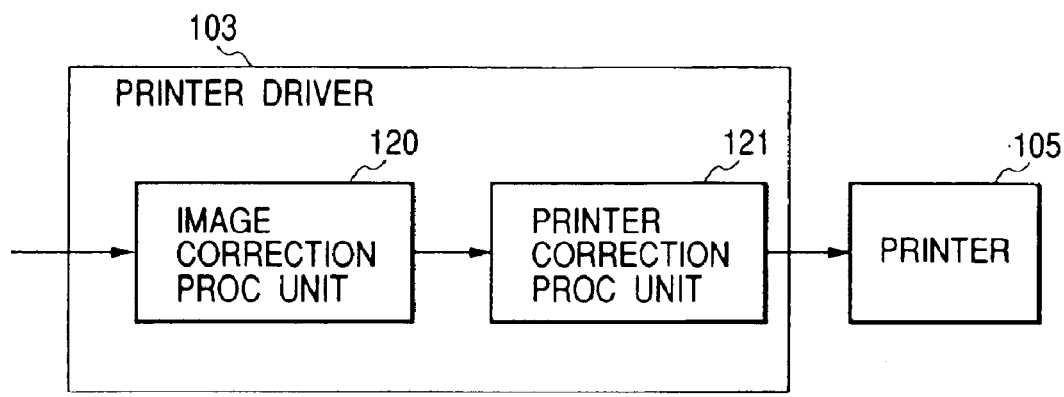
FIG. 2 is a block diagram showing a printer driver 103 in the first embodiment.

FIG. 2 is a block diagram showing the printer driver 103 in the present embodiment.

The printer driver 103 is composed of an image correction process unit 120 and a correction process unit for the printer (hereinafter called a printer correction process unit) 121.

By the image correction process unit 120, an image correction process is performed to color information included in the group of drawing instructions input from the OS 102. In this image correction process, a color noise reduction process is performed based on the R, G and B color information.

In the printer correction process unit 121, the drawing instructions are first rasterized based on the color information subjected to the image correction process, and a raster image is formed on the RGB 24-bit page memory. Then, for each pixel, the C, M, Y and K data depending on a printer color reproducibility are formed and transferred to the printer 106.

Next, the color noise reduction process in the image correction process unit 120 will be schematically explained.

(Color Noise Reduction Process Unit)

Figure 3:
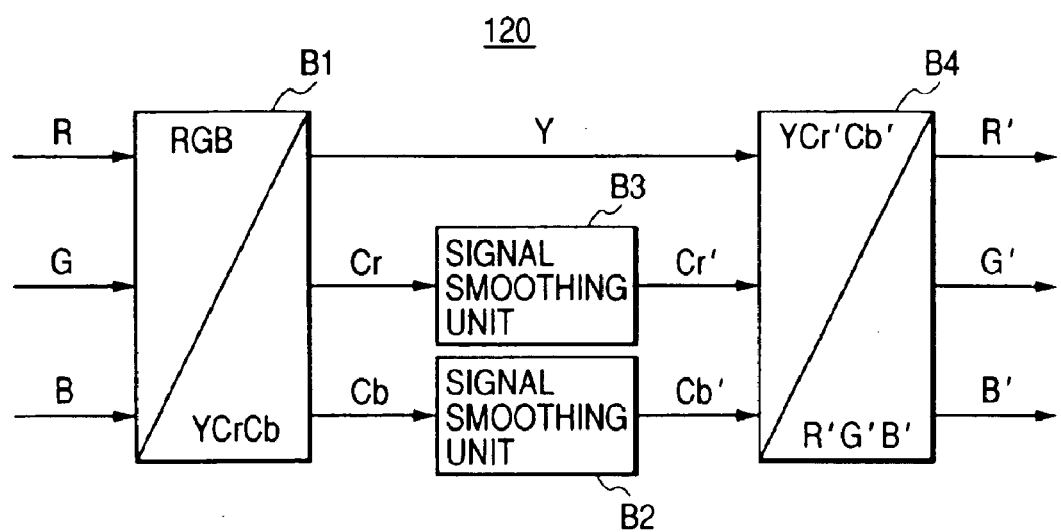
FIG. 3 is a block diagram showing an image correction process unit 120 in the first embodiment.

FIG. 3 is a block diagram schematically explaining the process of the image correction process unit 120.

In a block B1, input R, G and B signals are converted into a brightness signal Y and color difference signals Cr and Cb. Then, smoothing processes are performed to the color difference signals Cr and Cb by signal smoothing units B3 and B2 to generate color difference signals Cr' and Cb', respectively. Further, in block B4, the brightness signal Y and the color difference signals Cr' and Cb' are inversely converted to R', G', and B' signals.

In the present embodiment, a color noise is reduced by smoothing an rapid (or abrupt) change of the color difference signal while holding the brightness signal.

Next, the operation to reduce the color noise by smoothing the rapid change of the color difference signal while holding the brightness signal will be explained.

In such a color noise reduction unit, while the brightness signal Y(i,j) is maintained, the rapid change of the color difference signal is smoothed by using a low-pass filter shown in FIG. 5 for the color difference signals Cr(i,j) and Cb(i,j), as indicated by a following equation (5).

FIG. 5 is a diagram showing an weight configuration of the low-pass filter.

As shown in FIG. 5, by configuring the filter such that a notable (or remarkable) pixel (i,j) is surrounded by plural pixels, it is possible to perform the stable color noise reduction process irrespective of a direction of the input image. It should be noted that, in FIG. 5, the notable pixel is indicated by the pixel surrounded by a circle.

$$\tilde{f}(i, j) = \sum_{k=-2, l=-2}^{K=+2, l=+2} m(k, l) \cdot f(i+k, j+l) \quad (5)$$

wherein m(·,·) denotes the filter, and f(·,·.) denotes the signal. It should be noted that, here, f(·,·) is substituted for the color difference signals Cr(i,j) and Cb(i,j).

When the filtering process shown in the equation (5) is used as it is, the filtering process can not be performed to an image periphery edge part. At this time, as described in Japanese Patent Application No. 11-189637, it only has to perform an appropriate process for such the image periphery edge part.

In the present embodiment, the signal Y, Cr and Cb based on the NTSC (National Television System Committee) format are used. However, instead of the brightness signal, for example, the G signal from among the R, G and B signals may be used. Further, as the chromaticity signals, the signals Cr'=R/(R+G+B), Cb'=B/(R+G+B) and the like may be used.

Even if the noise reduction process is performed by using an L*a*b* coordinate system, a Yxy coordinate system or the like, it is possible to obtain the same effect as above. Further, it is thought to perform the same process as above for an L*c*h* cylindrical coordinate system, an HLS cylindrical coordinate system or the like. In this case, it is possible to perform the smoothing process after converting the coordinate values in the cylindrical coordinate system into the values in an orthogonal coordinate system.

Further, if it is enough that only color distortion has to be corrected, it is possible to perform the smoothing process to a change in hue angle. Similarly, even if the saturation is subjected to the smoothing process, it is possible to obtain the same effect as above.

$$f(i,j) = \tilde{f}(i,j) \quad (6)$$

In another example, after executing the equation (5), as shown in the above equation (6), the value after the smoothing of the color difference signal is fed back to the side of the original image signal. By doing so, it is possible to further increase the smoothing effect.

In case of performing such a feedback process as above, as shown in FIG. 6, it is possible to use a filter in which higher weight is allocated to the processed signal value as compared with the unprocessed signal value. By doing so, it is possible to further increase the smoothing effect of the color difference signal.

Further, by configuring the weight of the filter used in FIG. 6 and the like such that its denominator becomes the power of 2, it is possible to use a shift operation mechanism of a register and thus perform a high-speed increment process.

The filter is not limited to have the 5×5 size and to be symmetrical in the upper and lower directions and the right and left directions. Namely, if it is a filter having a low-pass filtering characteristic, it is possible to obtain the same color noise reduction effect. Of course, even if a median filter is used, it is possible to obtain the same effect as above.

Further, it is possible to suitably change a filter size according to image resolution. By changing the filter size, it is possible to obtain a stable process result irrespective of the image resolution.

With respect to a real space, a real-time area and a spatial frequency area, by performing a process for decreasing a high frequency component to the signals except for the brightness signal Y, it is possible to obtain the same effect as above.

Figure 4:
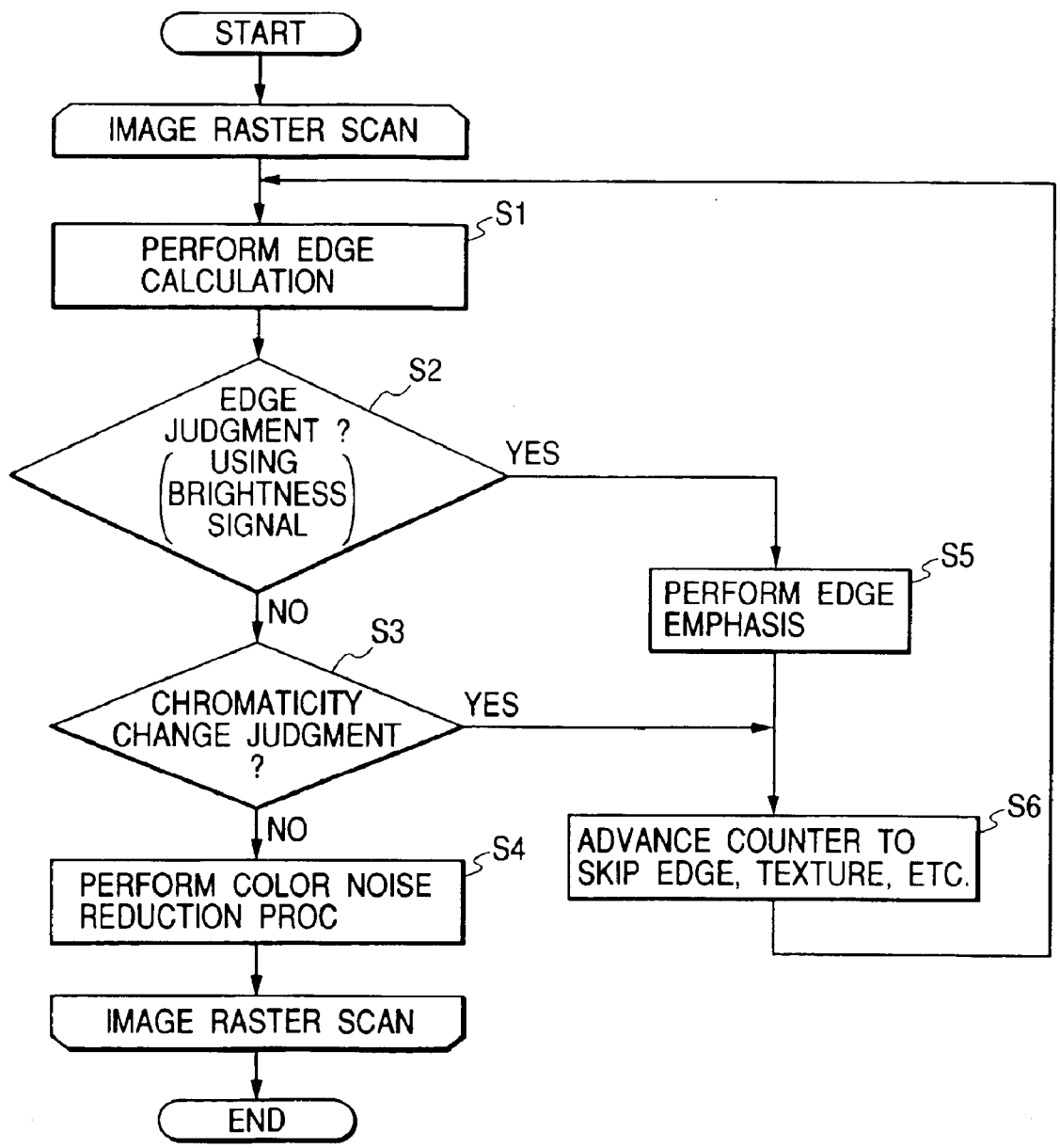
FIG. 4 is a flow chart showing an operation of a color noise reduction process which is performed by the image correction process unit 120 in the first embodiment.

FIG. 4 is a flow chart showing the operation of the color noise reduction process.

The color noise reduction process is performed to the image data part in the identical image indicated by the image drawing instruction. Therefore, for example, if a graphic and an image are included in the identical image, the image part is extracted according to an analysis result of the drawing instruction, and the color noise reduction process is then performed.

By only the color noise reduction process, apparent (or seeming) resolution might be deteriorated at an edge part of brightness and a color edge part where rapid chromaticity change is felt. Thus, in the present embodiment, edge judgment by an edge judgment unit, color edge judgment by a color edge judgment unit, edge emphasis by an edge emphasis unit and the like are added to prevent the deterioration of the apparent resolution at the color edge.

The color noise reduction process which is performed to the extracted image data will be explained in detail.

(Edge Calculation Unit)

In the edge calculation unit, an edge is calculated to the brightness signal Y by using, e.g., a Laplacian filter or the like, and a calculated value D__Y is held (S1).

The calculated value D__Y can be used in both the later edge judgement and the edge emphasis. If the edge emphasis is not performed, or if a high-speed unit dedicated for the edge emphasis can be used, the above value D__Y obtained might be cancelled.

Though the Laplacian filter is used in the above embodiment, a passing component of a high-pass filter in the spatial frequency area can be used for the edge calculation. Further, if an animation is assumed, a difference value in the real-time area can be used to obtain the same effect as above.

(Edge Judgment Unit)

In the edge judgment unit, the value D__Y held in the edge calculation unit is compared with a threshold value TH__Edge used for the edge judgment to judge the edge (S2).

It is possible to set the threshold value TH__Edge for each process target by analyzing the histogram of the input image or the like. In this case, for example, it is possible to prepare a frame memory storing the differentiation value of the brightness signal of the original image and thus obtain an appropriate threshold value every time by again obtaining the histogram for the frame memory storing the differentiation value, analyzing the obtained histogram with technique such as a discrimination analysis method or the like, and clustering the pixel values. Thus, a histogram calculation/analysis unit is necessary.

If judged by the edge judgment unit that the notable pixel f(i,j) is the edge, the flow advances to chromaticity change judgment (S3). Conversely, if judged that the notable pixel f(i,j) is not the edge, the flow advances to edge emphasis (S5). If the deterioration of the apparent resolution is not assumed to be a problem, it is possible to omit this edge emphasis step.

(Edge Emphasis Unit)

In the edge emphasis unit, the edge emphasis is performed by adding a brightness signal value Y(i,j) to the held value D__Y (S5).

Namely, the process based on an equation (1) is performed.

$$Y(i,j)=Y(i,j)+D\_Y \quad (1)$$

By performing the edge emphasis after or together with the color noise reduction, it is possible to perform the edge emphasis without emphasizing color noises.

Here, speed-up and simplification of the process are achieved by performing the edge emphasis with the data obtained for the edge judgment. However, it is possible to perform the edge emphasis in other steps in the flow chart of FIG. 4.

In a case where the edge emphasis has been already performed on the side of an input apparatus, the edge emphasis need not be performed at this step.

Further, without performing the edge emphasis, it is possible to pass the data of the original image without processing it for the edge area composed of one or more pixels including the notable pixel. In this case, it is possible to perform faithful original image reproduction for the image area other than the color noise area.

(Chromaticity Change Judgment Unit)

In the chromaticity change judgment unit, a "color edge" (a rapid change part of the chromaticity) which can not be detected from the change of the brightness signal Y is detected (S3).

$$D\_col\_CrL(i, j) = |\{Cr(i-2, j-1) + Cr(i-1, j-1) + Cr(i, j-1)\} - \{Cr(i+2, j+1) + Cr(i+1, j+1) + Cr(i, j+1)\}| \quad (2)$$

$$D\_col\_CrR(i, j) = |\{Cr(i+2, j+1) + Cr(i+1, j+1) + Cr(i, j+1)\} - \{Cr(i-2, j-1) + Cr(i-1, j-1) + Cr(i, j-1)\}| \quad (3)$$

Like the above, the color edge for the Cb component is obtained.

$$D\_col(i, j) = D\_col\_CrL(i, j) + D\_col\_CrR(i, j) + D\_col\_CbL(i, j) + D\_col\_CbR(i, j) \quad (4)$$

Here, the above calculated value D__col(i,j) is compared with a threshold value TH__col for the chromaticity change judgment, whereby the chromaticity change judgment is performed.

Though the threshold value TH__col is fixed in the above embodiment, it is possible to calculate a feature quantity of the histogram of the input image and perform the chromaticity change judgment based on the calculated feature quantity. Further, even if the value D__col(i,j) is calculated by using the differentiation value of the color difference signal, it is possible to obtain the similar effect. It should be noted that the automatic setting method of the threshold value TH__col here only has to properly use the technique such as the discrimination analysis method or the like described in the above edge judgment.

Further, in the chromaticity change judgment process of the present embodiment, the color noise part is occasionally judged as the color edge according to the threshold value TH__col. In such a case, in consideration of the frequency characteristic of the color edge, a band-pass filter structured to pass only the color edge can be used instead of the value D__col(i,j) for the above judgment.

Further, it is possible to use other method by which the rapid change of the chromaticity is detected from only the color difference signal irrespective of the change of the brightness signal Y. For the edge part and the color edge part, the color noise reduction process is not performed to prevent the deterioration of the apparent resolution, and the process advances to a next pixel (S6). Here, if it is judged that there is the edge part or the color edge part, it is possible to skip several pixels to maintain correspondence of the images around the edge. In a step S4, the color noise reduction process is performed for the pixels not corresponding to the edge part and the color edge part. Such the processes are sequentially performed to the parts extracted as the images.

[Second Embodiment]

Here, in order to avoid descriptive complexity, only the parts different from the first embodiment will be partially explained in the second embodiment.

(Edge Judgment Unit/Chromaticity Change Judgment Unit)

In the first embodiment, the input image data which is judged to be the edge or the color edge by the edge judgment unit or the chromaticity change judgment unit is not processed any more.

However, after such the edge judgment or the chromaticity change judgment, the junction (tie part) of the edge part and non-edge part might stand out too much.

In such a case, an edge degree E(i,j) is defined for chromaticity data Col(i,j) (=Cr(i,j), Cb(i,j)) being the process target as follows.

$$E(i,j)=D\_Y(i,j) \times H(D\_Y(i,j)-TH\_Edge)/TH\_Edge \qquad (7)$$

By using this, the average of the target chromaticity data and the chromaticity data after the low-pass filtering is obtained as follows.

$$Col(i,j)=E(i,j) \times Col(i,j)+(1-E(i,j)) \times Low(Col(i,j)) \qquad (8)$$

Thus, it is possible to prevent that the junction of the edge part and non-edge part might stand out too much.

Here, H(·) denotes a Heaviside step function, and Low(·) denotes the low-pass filter.

(Other Judgment Unit, High Saturation Judgment Unit)

The color noise frequently stands out in a low-saturation area. Thus, a saturation S(i,j) (=sqrt(Cr^2+Cb^2)) of the notable pixel is calculated. Then, if the saturation S(i,j) exceeds, e.g., a threshold value TH_Saturation, the color noise reduction process is not performed. By doing so, it is possible to perform faithful reproduction of a high-saturation part and a high-speed process.

Due to a color noise in an achromatic color (no coloring) area, it might seem that a color is being given in a part of the achromatic color area. Thus, when the notable pixel has no color, the color noise reduction process is not performed. By doing so, it is possible to perform faithful reproduction of the achromatic color area and a high-speed process.

(Modification)

In the above embodiment, the color noise reduction process is uniformly performed without any relation to whether or not the notable pixel is the color noise.

However, by performing color noise detection or color noise degree detection and then performing the color noise reduction process according to the detected color noise part or color noise degree, it is possible to further increase the effect.

As a color noise detection method, there is a method for using, e.g., a differentiation value in a chromaticity plane. Further, it is possible to provide a mode to reduce the color noise on the basis of user's manual color noise area designation.

If the color noise degree is defined by a rate that the process target area is the color noise, a color noise degree Cn(i,j) can be obtained by a following equation (9).

$$Cn(i,j)=|(Col(i,j)-\text{med}(Col(i,j)))|/(|\text{med}(Col(i,j))|) \qquad (9)$$

wherein med(·) denotes an intermediate value of chromaticity of the notable pixel and the eight pixels adjacent to the notable pixel.

For data of which color noise degree Cn(i,j) is high, a filter shown in FIG. 7 in which high weight is allocated to the pixels away from the notable pixel is used to perform the color noise reduction process. Thus, it is possible to obtain a higher color noise reduction effect.

Here, the target area which is used to calculate the intermediate value med(·) may be an area having any shape and size if such the area includes the notable pixel. Further, even if an average value is used instead of the intermediate value med(·), it is possible to obtain the same effect as above.

[Third Embodiment]

Here, in order to avoid descriptive complexity, the same steps as those in the first embodiment are added with the same symbols and the explanation thereof will be omitted. The explanation of step S4 in FIG. 4 applies to step S13 in FIG. 8.

Figure 8:
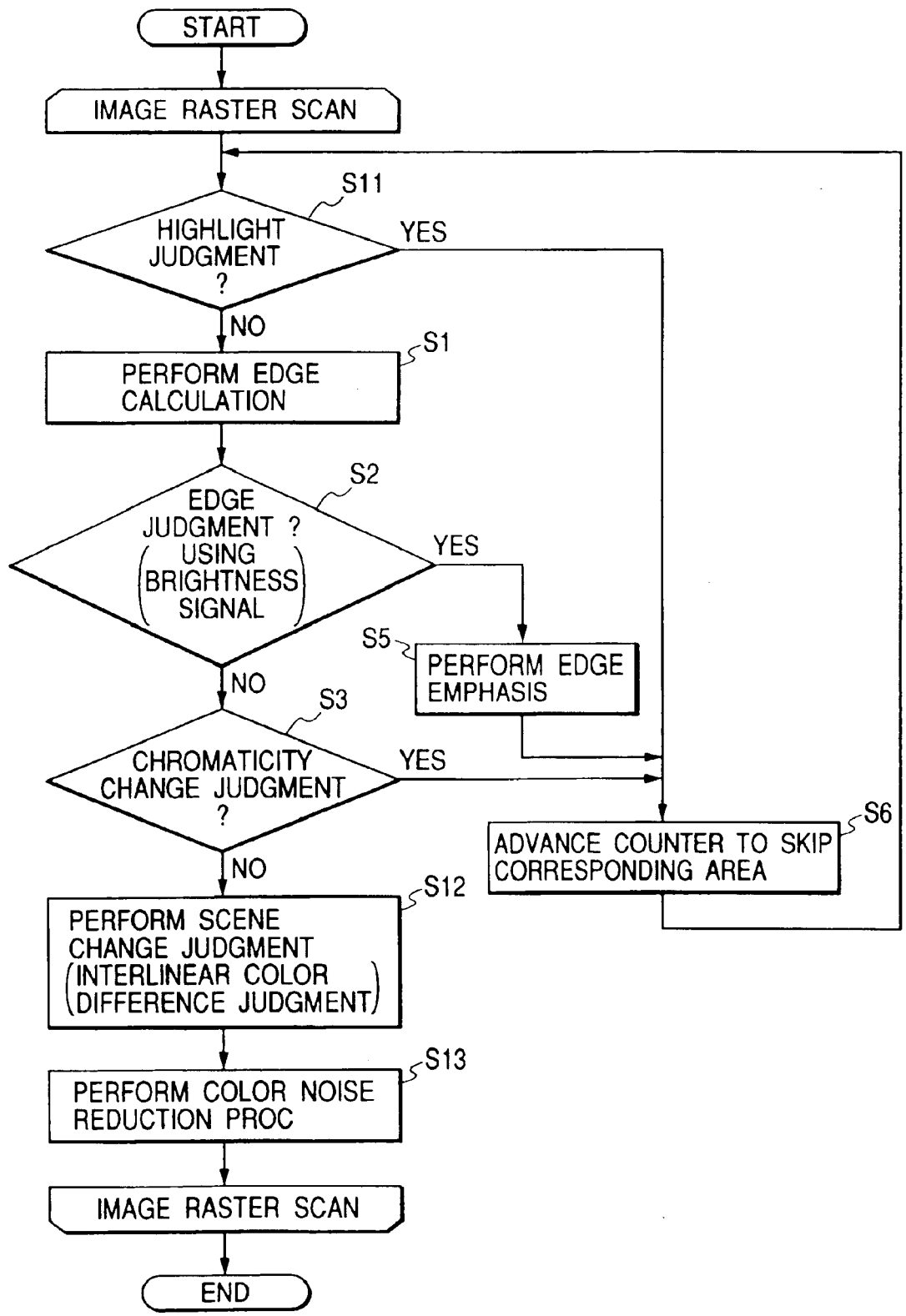

FIG. 8 is a flow chart showing the operation of the color noise reduction process according to the present embodiment.

(Highlight Judgment Unit)

A hard copying apparatus such as an inkjet printer or the like adopts a method of substituting paper white as white. For this reason, a white part (R=G=B=255) is the paper white, but, e.g., dots are emitted onto a non-white part by the Inkjet printer. Thus, tint is similar between the above two cases, but presence of the dots might be felt discontinuous.

Figure 14:
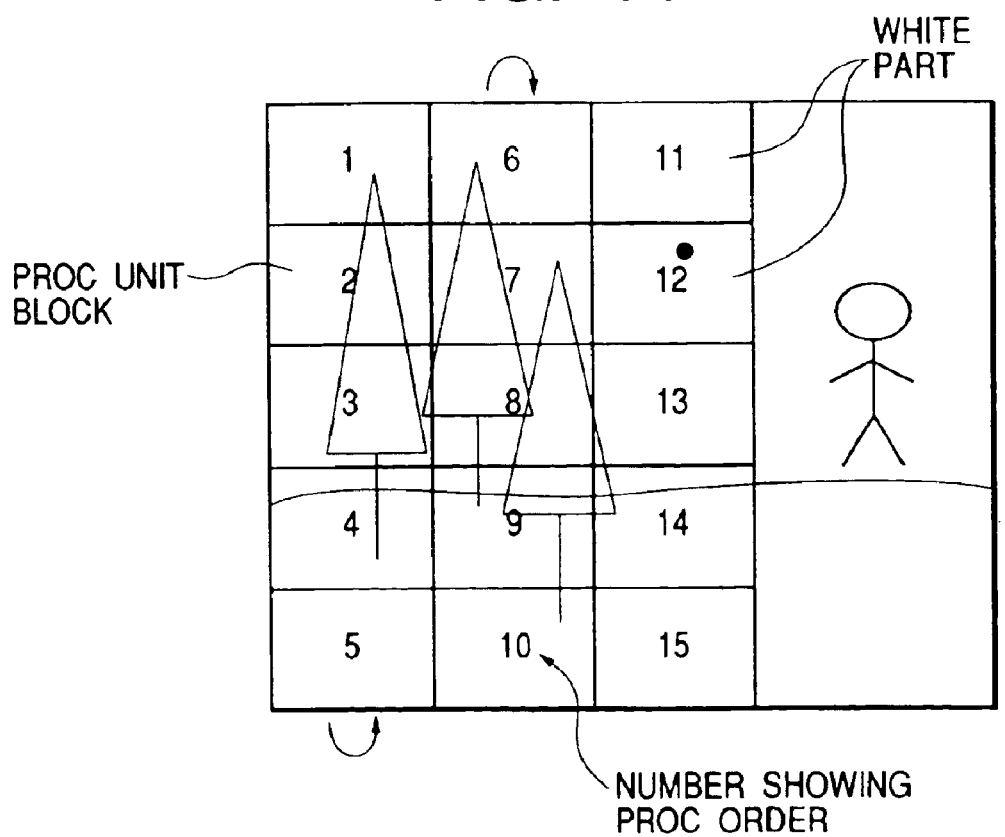
FIG. 14 is a diagram showing image data subjected to a filtering process with different tint for each divided area in case of dividing the image data, and an image division method.

FIG. 14 is a diagram showing image data subjected to a filtering process with different tint for each divided area in case of dividing the image data, and an image division method.

In any case, as shown in FIG. 14, in a case where a white block 11 and a block 12 which is essentially the white block but partially includes a non-white texture exist (called a non-white block hereinafter), if the notable pixel and its peripheral pixels are smoothed by the color noise reduction process, tint might be slightly different between the white block and the non-white block. Namely, the white block is the paper white, but the dots might be emitted to the non-white block.

Thus, in the highlight judgment unit, it is judged whether or not one point is the paper white (S11). Then, the color noise reduction process is not performed to the point judged to be the paper white (S6). As a highlight judgment method used here, it is possible to appropriately use a method of judging highlight such as "(R≧250)AND(G≧250)AND(B≧250)", "Y≧250", or the like.

Figure 13:
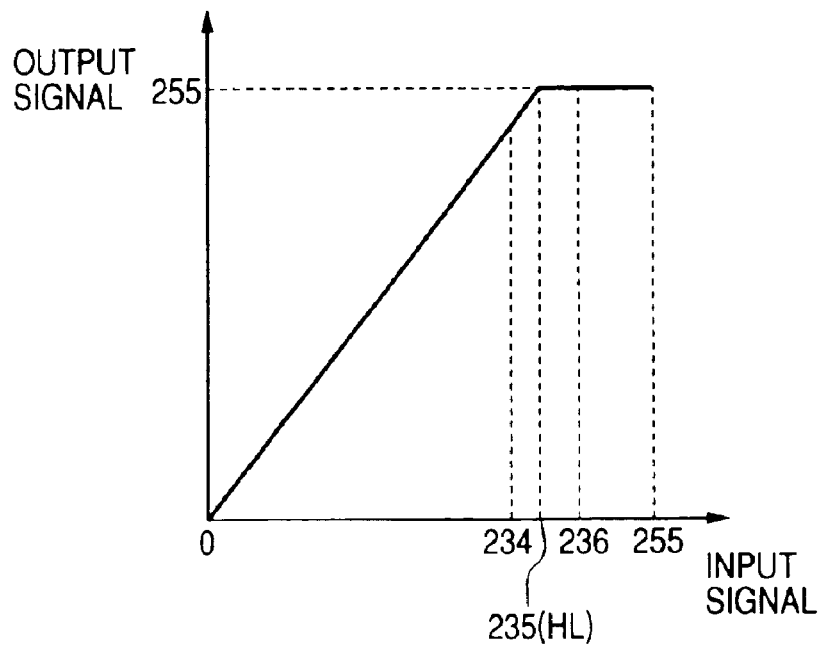
FIG. 13 is a diagram showing a lightness correction curve in case of lightness correction.

Further, there is a case where it is intended, after the color noise reduction process, to perform an image process such as a lightness correction process or the like by using a lightness correction curve shown in FIG. 13. Also in this case, like the above, the pixel which essentially has the pixel value 235 is changed to have the pixel value "234" or "236" because of the smoothing in the color noise reduction process, whereby a band unevenness part occurs between the paper white part and the dot-emitted part.

In this case, a highlight point HL is obtained from the above determined lightness correction curve (S11), and it only has not to perform the color noise reduction process to the pixels of the pixel values in the vicinity of the highlight point HL (S6).

Further, in a printer such as a sublimate printer or the like capable of sufficiently expressing gradation, the above band unevenness is not so remarkable. In such a case, it is possible not to perform the above highlight judgment process.

By only the color noise reduction process, apparent (or seeming) resolution might be deteriorated at the edge part of brightness and the color edge part where rapid chromaticity change is felt though brightness change is small. Thus, in the present embodiment, edge judgment by the edge judgment unit, color edge judgment by the color edge judgment unit, edge emphasis by the edge emphasis unit and the like are added to prevent the deterioration of the apparent resolution at the color edge.

(Scene Change Judgment Unit: Interlinear Color Difference Judgment Unit)

In the above embodiment, the color noise reduction process is performed by using the 5×5 filter shown in FIG. 5.

Figure 12:
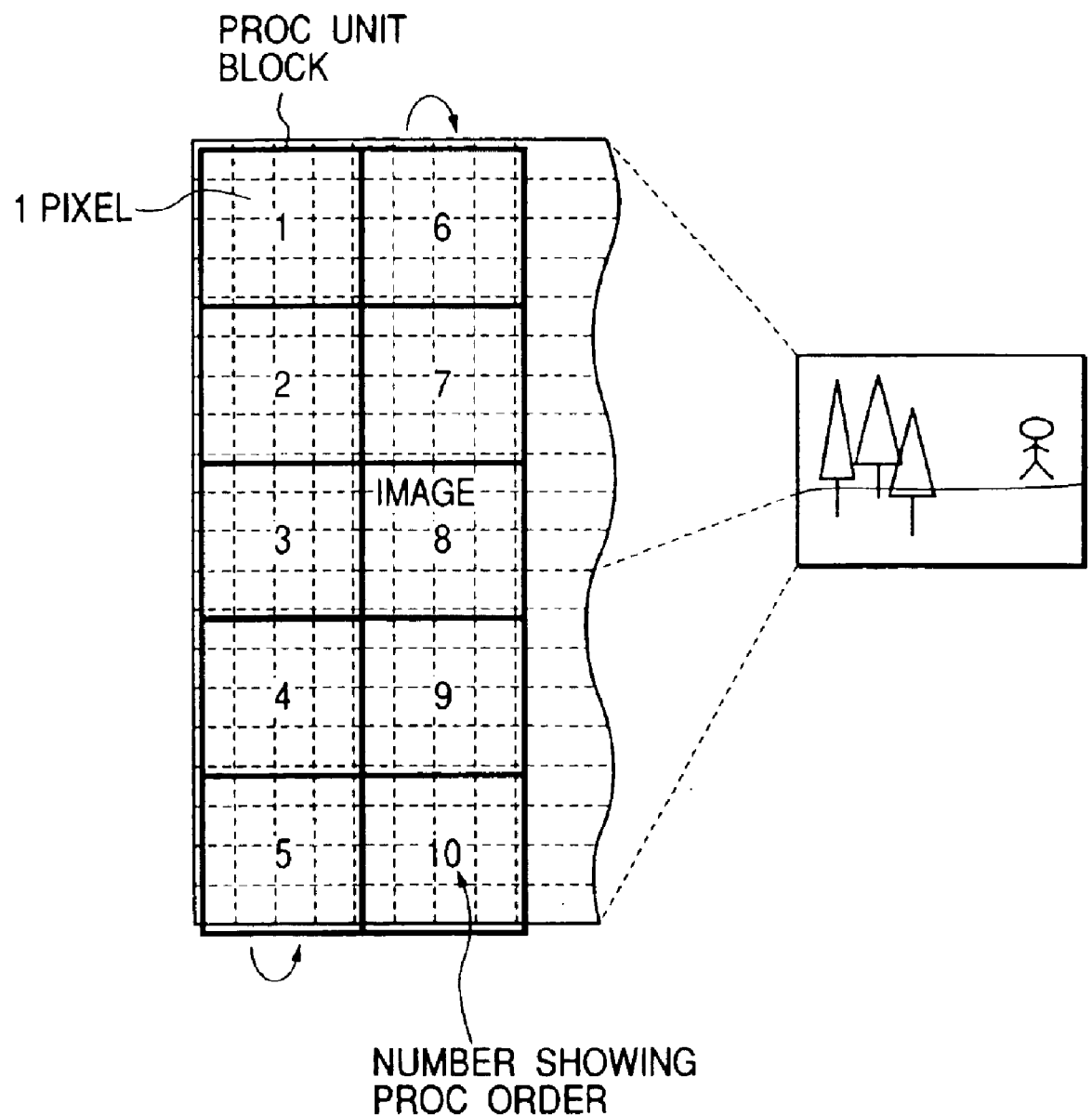
FIG. 12 is a diagram showing an image data division method in a case where image data is divided and then processed.

In this configuration, the filtering process is performed to image data added with numerals 3 and 8 in FIG. 12, in the same manner as for other image process unit block. For example, in a case where image data of a scenery photograph or the like is processed, the smoothing is performed with brown of the ground and blue of the sky which are uncontinuous in the original image data. Thus, there is a room for improvement that tint of the image after the filtering process changes.

Thus, in the above embodiment, in the interlinear color different judgment unit, if an average color difference between a process-target line and a line above the process-target line by one is not equal to or smaller than a color difference threshold value Th#ColDiff#Line, it is considered that the input image data to such an image process module as above is uncontinuous, whereby such the input image data is detected as an uncontinuous point (S12).

In the present embodiment, a kind of filter is changed on the basis of the positional relation between the line detected as the uncontinuous point and the target image data.

Figures 9A, 9B, 9C, 10:
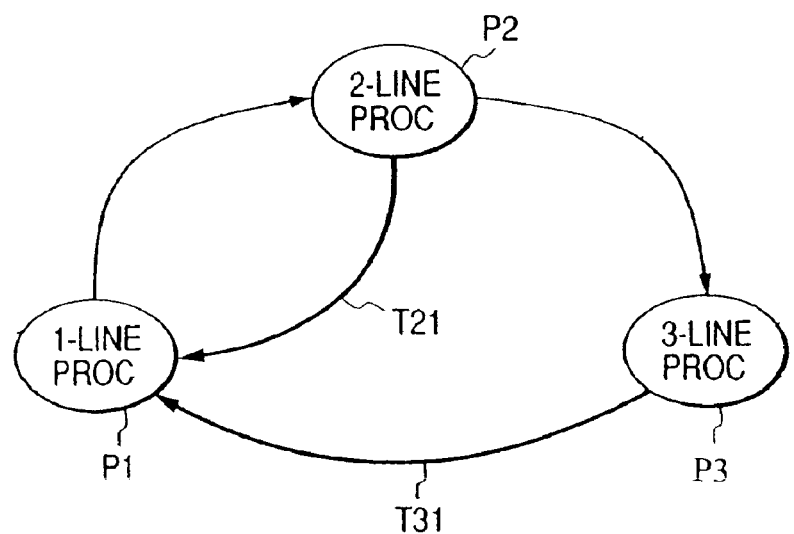
FIGS. 9A, 9B and 9C are diagrams showing weight configurations of the low-pass filters.
FIG. 10 is a state transition chart showing a process sequence in a case where a scene change judgment unit is provided, and the filter for processing the image is changed according to a position of a process target in an image.

FIGS. 9A, 9B and 9C are diagrams showing the weight configurations of the low-pass filters. Namely, FIG. 9A shows the filter for a three-line process, FIG. 9B shows the filter for a two-line process, and FIG. 9C shows the filter for a one-line process.

FIG. 10 is a state transition chart showing a process sequence in a case where the scene change judgment unit is provided, and the filter for processing the image is changed according to a position of the process target in the image.

Figure 11:
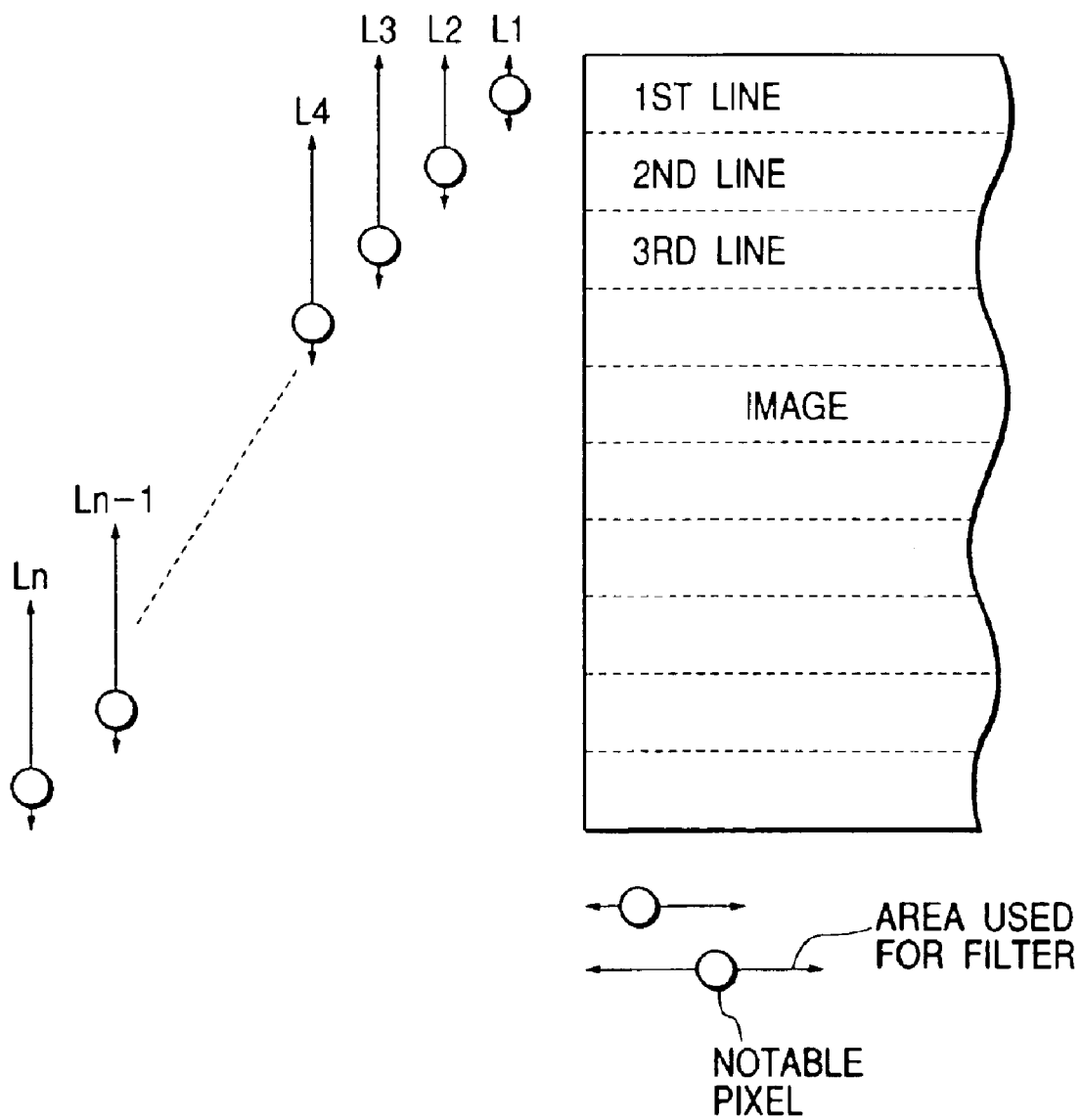
FIG. 11 is a diagram showing how to change the filter in the case where the filter for processing the image is changed according to the position of the process target in the image.

FIG. 11 is a diagram showing how to change the filter in the case where the filter for processing the image is changed according to the position of the process target in the image.

As shown in FIG. 11, in the color noise reduction process, when the first line of the input image is processed, the smoothing of the color difference signal is performed by the filter of FIG. 9C with use of only the first line of the image (L1 in FIG. 11, P1 in FIG. 10). When the second line of the input image is processed, the smoothing of the color difference signal is performed by the filter of FIG. 9B with use of the second line of the image and the first line above the second line by one (L2 in FIG. 11, P2 in FIG. 10). When the third line of the input image is processed, the smoothing is performed by the filter of FIG. 9A with use of the third line of the image, the second line above the third line by one, and the first line above the third line by two (L3 in FIG. 11, P3 in FIG. 10) (S13).

Namely, when the uncontinuous point of the input image data is detected in the interlinear color different judgment unit, as shown by symbols T21 and T31 in FIG. 10, the filtering process area is changed from the current three-line process of P3 in FIG. 10 or the two-line process of P2 in FIG. 10 to the one-line process of P1 in FIG. 10. This is called a memory refresh operation after band change judgment.

By performing the filtering process with use of such the filter structure, for example, as shown in FIG. 12, even when one image data is divided by the application and input to the image process module, it is possible to perform the appropriate filtering process. Here, numerals 1 to 10 in FIG. 12 denote a range of the image data which is divided and input to the image process module. Further, each pair of upward and down ward arrows shown in FIG. 11 denotes a range of the image data used when the notable line indicated by a white circle is smoothed.

Further, by performing the filtering process with use of such the filter structure, the output is obtained every time the image data is input. Thus, it is possible to perform the filtering process that a delay is not caused in the image data output after the process.

When the average color difference is obtained, the average color difference need not necessarily be an accurate color difference. For example, it is possible to appropriately perform sampling for the ten pixels of the notable line on the image and then use the average color difference obtained for such the ten pixels. Further, it is possible to obtain the color difference by using, e.g., only the R component of the R, G and B data or only the Y component of the Y, Cr and Cb data.

[Fourth Embodiment]

In the present embodiment, the process which is performed by the image correction process unit 120 in FIG. 2 when an enlargement process is performed to the input image will be concretely explained.

It should be noted that the structure of the image process apparatus is the same as explained in the above other embodiments.

The process procedures of image feature quantity calculation, natural image judgment, image correction method determination, brightness correction, saturation correction, color noise reduction and image enlargement will be explained.

Each of the above image processes is performed to the image data part concerning the identical image indicated by the image drawing instruction. Therefore, for example, if a graphic and an image are included in the output image, the image part concerning the identical image is extracted, and the image process shown in FIG. 15 is performed.

It should be noted that an image type can be discriminated by judging a kind of drawing instruction. Namely, the image is indicated by a raster data command, the graphic is indicated by a vector command, and text data is indicated by a text command.

Figure 15:
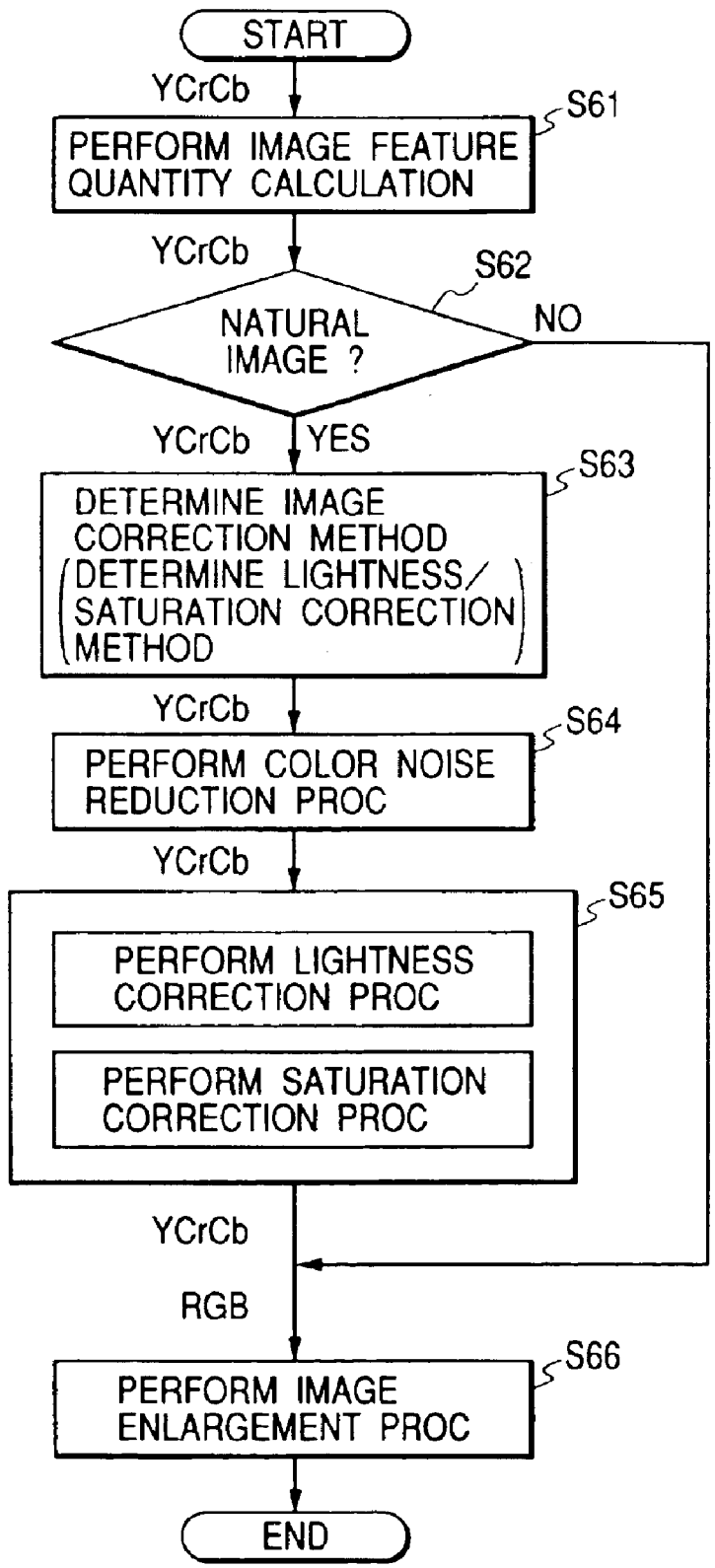
FIG. 15 is a flow chart showing a suitable process procedure for each process in the first embodiment.

In the present embodiment, the processes are performed in the order shown in FIG. 15 to be able to properly obtain the color noise reduction effect.

(Image Feature Quantity Calculation Unit)

In the image feature quantity calculation unit of a step S61, as the feature quantity of the image part, on the basis of the input image data at the image part, a brightness histogram is first created, and a highlight point HL, a shadow point SD and the number of colors are calculated. Further, a saturation signal is created from the color difference signal, and an average saturation value Save is calculated.

In the present embodiment, the saturation signal is created from the color difference signal according to an equation $S=\text{sqrt}(Cr^2+Cb^2)$.

Here, if the size of the process-target image is large, it is possible to obtain the image feature quantity by appropriately sampling reference points from the target image. In the present embodiment, for example, 10000 reference points are selected in the input image data of 1600×1200 pixels, and various histograms are obtained for such the selected reference points. Here, as a reference point selection method, for example, there is a method of setting a sampling interval in the image lateral direction to 1600Mod(100) pixels and a sampling interval in the image longitudinal direction to 1200Mod(100) pixels, and scanning the target image with the respective sampling intervals to obtain the image feature quantity.

It should be noted that, as the image feature quantity obtained in the step S61, it is possible to calculate another feature quantity such as a saturation histogram or the like if such the feature quantity accords to a condition used in each process later described.

(Natural Image Judgment Unit)

The image indicated by the raster data command includes a computer graphic or the like of which characteristic is different from that of a natural image such as a portrait and a scenic. For example, since the computer graphic is the image created by using the application, to begin with any color noise does not exist. Further, if the later-described color noise reduction process is performed to a gradation image such as the computer graphic or the like, deterioration of coordination might occur.

Similarly, if the later-described lightness and saturation correction process is performed to the gradation image such as the computer graphic or the like, deterioration of coordination might occur in the vicinity of highlight, in the vicinity of darkness, at a high-saturation part, or the like.

Accordingly, in the present embodiment, in the natural image judgment unit of a step S62, it is judged based on the image feature quantity obtained by the image feature quantity calculation unit of the step S61 whether or not an image kind of the process-target image judged to be the image based on the drawing instruction is a natural image, and it is controlled not to perform the later-described color noise reduction process and lightness and saturation correction process to the natural image. Conversely, if judged that the image kind is not the natural image, the flow advances to a step S66.

Here, as shown in FIG. 18, the used colors tend to be biased in an artificial gradation image such as the computer graphic or the like. Thus, the natural image judgment pays attention to this tendency and thus selects a non-natural image based on whether or not the distribution of the brightness histogram is discrete. In the present embodiment, for example, if the number of used colors calculated by the image feature quantity calculation unit of the step S61 is smaller than a threshold value Th_Cols_Photo, the process-target image is judged to be the non-natural image.

In the present embodiment, the pseudo number of used colors obtained from the brightness histogram is used as the number of used colors. However, for example, it is possible to use the result obtained by counting different combinations of the brightness and color difference signals.

(Image Correction Method Determination)

In the image correction method determination unit of a step S63, the image correction method in the later-described lightness and saturation correction process unit is determined for the image judged to be the natural image by the natural image judgment unit of the step S62, by using as indexed the highlight point HL and the shadow point SD obtained in the image feature quantity calculation unit of the step S61.

(Brightness Correction Method Determination)

Figure 19C:
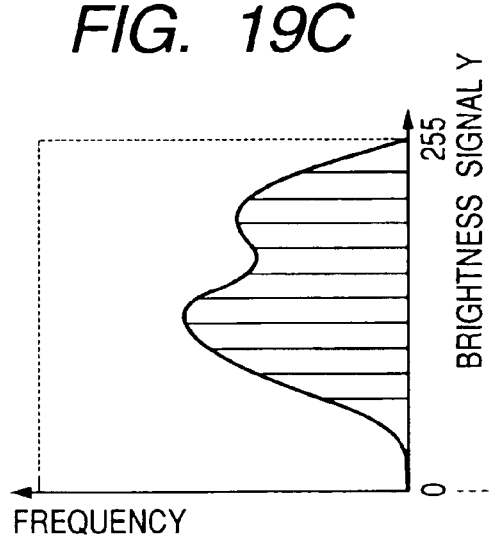
FIGS. 19A, 19B and 19C are diagrams showing an example of a brightness correction curve determination method.

The brightness correction method will be briefly explained with reference to FIGS. 19A, 19B and 19C.

Figure 19A:
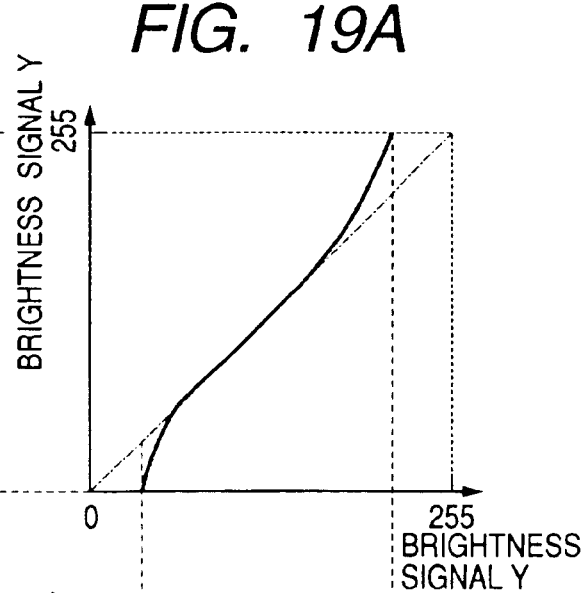
Figure 19B:
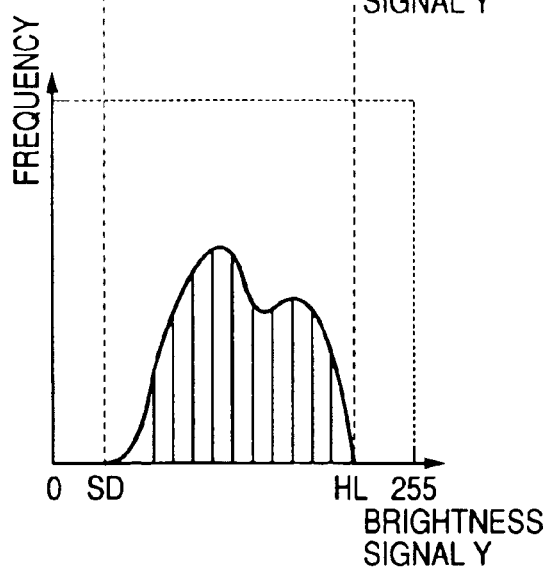

If the brightness histogram of the process-target natural image is assumed to be shown in FIG. 19B, it can be understood from FIG. 19B that the brightness distribution of this natural image is biased to the center and thus this image has scarce gradation.

Thus, in order to improve the gradation of this natural image, a brightness correction curve is set as shown in FIG. 19A such that the highlight point HL and the shadow point SD become "255" and "0" respectively.

(Saturation Correction Method Determination)

A stored color tends to be shifted to the higher saturation side as compared with the actual tint. Accordingly, in general color reproduction of a natural image, when a process to emphasize the saturation is performed, its presentation is good.

Thus, if the average saturation value Save obtained by the image feature quantity calculation unit of the step S61 satisfies Save<Th_High_Saturation, for example, a saturation emphasis process condition is set to raise the saturation by 20%.

In the present embodiment, the saturation signal is created from the color difference signal according to the equation $S=\sqrt{Cr^2+Cb^2}$.

Then, the above saturation emphasis process is performed to the saturation signal S, and an inverse process of the above equation is performed to convert the saturation signal into the color difference signal.

It should be noted that it is possible to previously set the saturation emphasis process condition by a user, or to calculate the saturation emphasis process condition on the basis of the average saturation value Save.

(Color Noise Reduction Process Unit)

In the color noise reduction process unit of a step S64, the color noise reduction process as explained in the first to third embodiments is performed.

When the color noise is included in the process-target image, the color noise part might be emphasized by the brightness and saturation correction process or the later-described image enlargement process.

Further, even if the color noise reduction process is performed, the effect is not often achieved enough for the emphasized color noise part.

Thus, in the present embodiment, the color noise reduction process is first performed, and the brightness and saturation correction is performed to the image data after the noise reduction process.

As in the present embodiment, by the color noise reduction process to perform the smoothing process to color difference, there is a case where apparent resolution at the color edge part for brightness or at the color edge part where rapid chromaticity change is felt though brightness change is small is deteriorated. Thus, in the present embodiment, edge judgment by the edge judgment unit, color edge judgment by the color edge judgment unit, edge emphasis by the edge emphasis unit and the like are added to prevent the deterioration of the apparent resolution at the color edge.

(Brightness and Saturation Correction Process Unit)

The brightness and saturation correction process unit of a step S65 will be explained.

As to the image data subjected to the color noise reduction by the color noise reduction process unit of the step S63, the brightness and color difference signals are corrected in the step S65 on the basis of the brightness correction method and the saturation correction method obtained in the step S63.

Further, the brightness signal is corrected based on the brightness correction curve obtained in the step S63.

On the other hand, as to the saturation signal, if judged in the step S62 that the average saturation value Save is smaller than the threshold value Th_High_Saturation, a process according to the saturation emphasis process condition set for the saturation signal is performed to the color difference signal.

$$Cr''=1.2 \times Cr'$$

$$Cb''=1.2 \times Cb'$$

According to the present embodiment, it is possible to perform the brightness and saturation correction process with use of the brightness signal Y and the color difference signals Cr and Cb used in the color noise reduction process unit as it is. Namely, it is possible to perform the color noise reduction process and the brightness and saturation correction process efficiently.

In the present embodiment, the lightness correction is performed based on a lookup table, and the saturation correction is performed based on simple calculation, whereby a high-speed process is achieved.

When a color palette dedicated for the image data exists, the color conversion (lightness and saturation correction) is performed to the color palette to perform the lightness and saturation correction process in the block, whereby a high-speed process is achieved.

(Image Enlargement Process: Anti-Aliasing Process)

Next, an image scaling process (anti-aliasing process) in the step S66 will be explained.

When a digital camera image is printed and output by the inkjet printer, since the digital camera image is the image at monitor resolution level, it is necessary when the digital camera image is output by the inkjet printer to convert the resolution of this image into resolution by which one nozzle of an ink emission unit is assumed to be minimum. Ordinarily, when the image of the digital camera of 2,000,000-pixel class (1600×1800 pixels) is output by the inkjet printer of about 600 dpi, it is necessary to enlarge or expand the digital camera image to two or three times.

As an enlargement method, it is possible to use an interpolation method such as a conventionally known bicubic method or the like. Further, when the anti-aliasing is not especially needed, it is possible to use a simple enlargement method by which one pixel in an original image is allocated to four pixels in an output image.

According to the image enlargement process, the color noise part is similarly enlarged. On the other hand, since the filter size for the color noise reduction process in the present embodiment is a fixed size, the color noise reduction effect becomes weak. Thus, in the present embodiment, the image enlargement process is performed after the color noise reduction process was performed so as to prevent that the color noise is enlarged due to the image enlargement process. Further, as described above, the color noise can be satisfactorily reduced by the color noise reduction process.

Further, since points to be processed (called process-target points hereinafter) increases due to the image enlargement process, such the image enlargement process is finally performed. By doing so, it is possible to reduce the number of color noise reduction processes and lightness and saturation correction processes, whereby an efficient process is achieved.

In the present embodiment, the color noise reduction process and the brightness and saturation correction process are performed to the luminance and color difference signals. Besides, such a color noise reduction process and a brightness (lightness) and saturation correction process as above can be performed to an image signal indicated by a signal representing brightness and a signal representing tint. For example, it is possible to use a CIE L*a*b* system, or use the G component of R, G and B signals as the signal representing brightness and Cr'$\Delta$R/(R+G+B), Cb' $\Delta$B/(R+G+B) as the signal representing tint.

Further, it is possible to use a cylindrical coordinate system such as L*c*h* system, an HLS system or the like. In case of using the cylindrical coordinate system, it is possible to perform the smoothing after converting the coordinate values in the cylindrical coordinate system into the values in an orthogonal coordinate system. Further, when it is enough to correct only color distortion, it is possible to perform the smoothing to a change in hue angle.

Further, when the edge emphasis process is premised, or when the deterioration of the apparent resolution is not assumed to be a problem, it is possible to omit the edge judgment process and the edge emphasis process.

Further, when the process by which the "color edge" is emphasized is performed to the image after the color noise reduction process, it is possible to omit the process by the chromaticity change judgment unit.

Further, it is possible to control whether or not the color noise reduction process should be performed based on a user's manual instruction, and to control the color noise reduction process to be performed according to the result of the above judgment process.

[Fifth Embodiment]

In the above fourth embodiment, it was assumed that the digital camera image is printed and output, and the case where the input image is subjected to the enlargement process was explained. However, according to circumstances, an image reduction process is performed. In such a case, since the process-target image can be reduced in size by the image reduction process, it is unnecessary to perform the process at the end. Namely, it is possible to perform the image reduction process, the color noise reduction process, and then the lightness and saturation correction.

As above, when a scaling rate of the input image has been previously known, it is possible to adaptively determine the order of the image scaling process and other image processes according to this scaling rate, whereby a more efficient image process can be achieved.

Further, when the output image is small, it is necessary to perform a thinning process to the input image. In the thinning process, when the thinning is performed by interpolation with use of the signal values of the peripheral pixels around the notable pixel, the tint of the image after the reduction process might be different due to the color noise on the image. In such a case, in consideration of quality of the output image, it is desirable to perform the color noise reduction process, the image reduction process, and finally the lightness and saturation correction.

However, when the output image is small, the color noise on the image is unremarkable. Thus, when the output image size is smaller than a predetermined size, the color noise reduction process need not be performed.

As above, in case attaching importance to the quality of the output image, it is desirable to determine the order of the image processes on the basis of the scaling rate of the image scaling process, the size of the output image, and the scaling method. It should be noted that, even if all of the above three conditions are not considered but only one condition is considered to control the order of the image processes, it is possible to obtain the similar effect.

[Sixth Embodiment]

Figure 16:
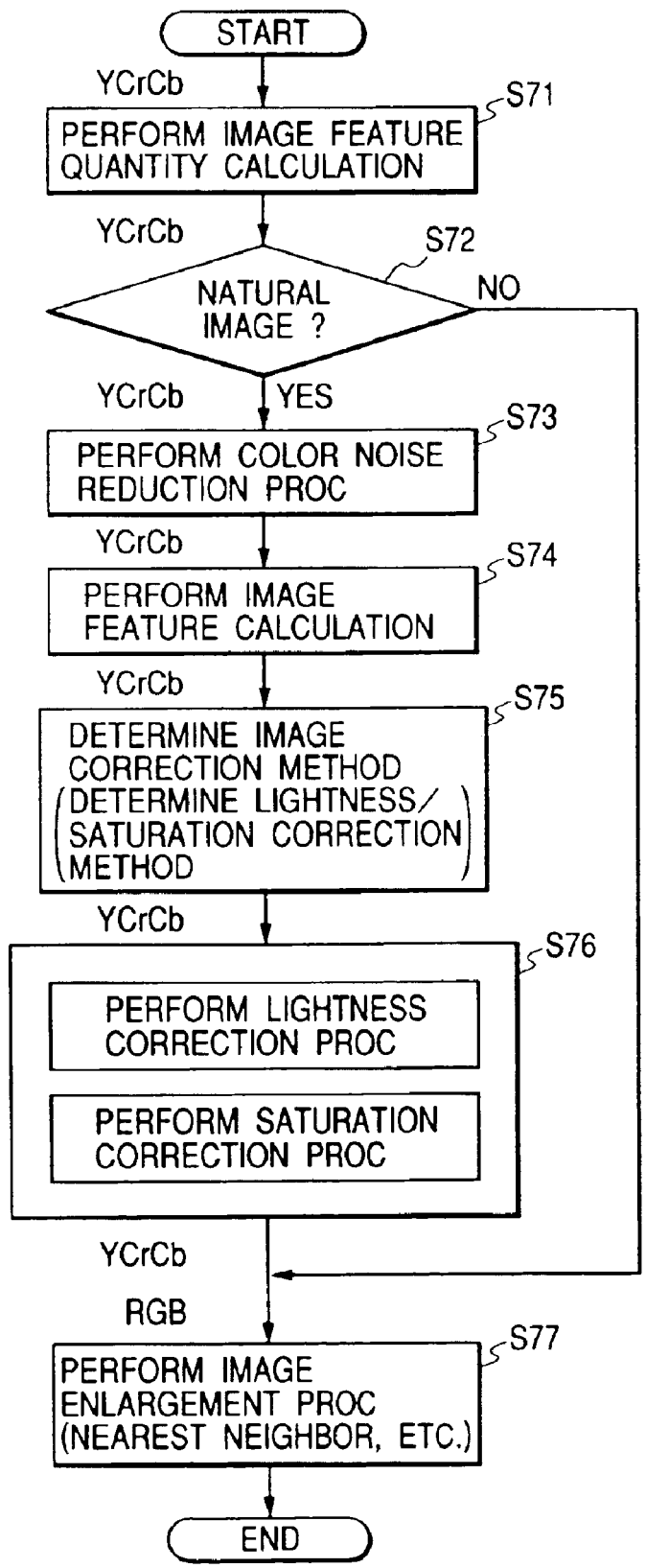
FIG. 16 is a flow chart showing a suitable process procedure for each process in the second embodiment.

The sixth embodiment of the present invention will be explained with reference to FIG. 16. Hereinafter, in order to avoid explanatory complexity, the explanation of the same steps as those in the above embodiments will be omitted, and process procedures will be briefly described. The explanation of steps S65 and S66 in FIG. 5 applies to steps S76 and S77, respectively, in FIG. 16.

On the basis of the feature quantity obtained by the image feature quantity calculation unit of a step S71, it is judged in a step S72 whether or not the target image is the natural image. Then, in a step S73, the color noise reduction process is performed to the image judged to be the natural image.

Further, the image feature quantity for the image data of which color noise has been reduced is again calculated by the image feature quantity calculation unit of a step S74. Then, by using the again-calculated image feature quantity, the lightness and saturation correction method is determined by the image correction method determination unit of a step S75.

Since the color noise is easily generated in a low-lightness part, it is possible that the shadow point SD shifts from the essential shadow point. However, by processing the image according to the process procedure of the present embodiment, it is possible to perform the image correction process with use of the more accurate shadow point SD, whereby it is possible to obtain a suitable processed result.

[Seventh Embodiment]

Figure 17:
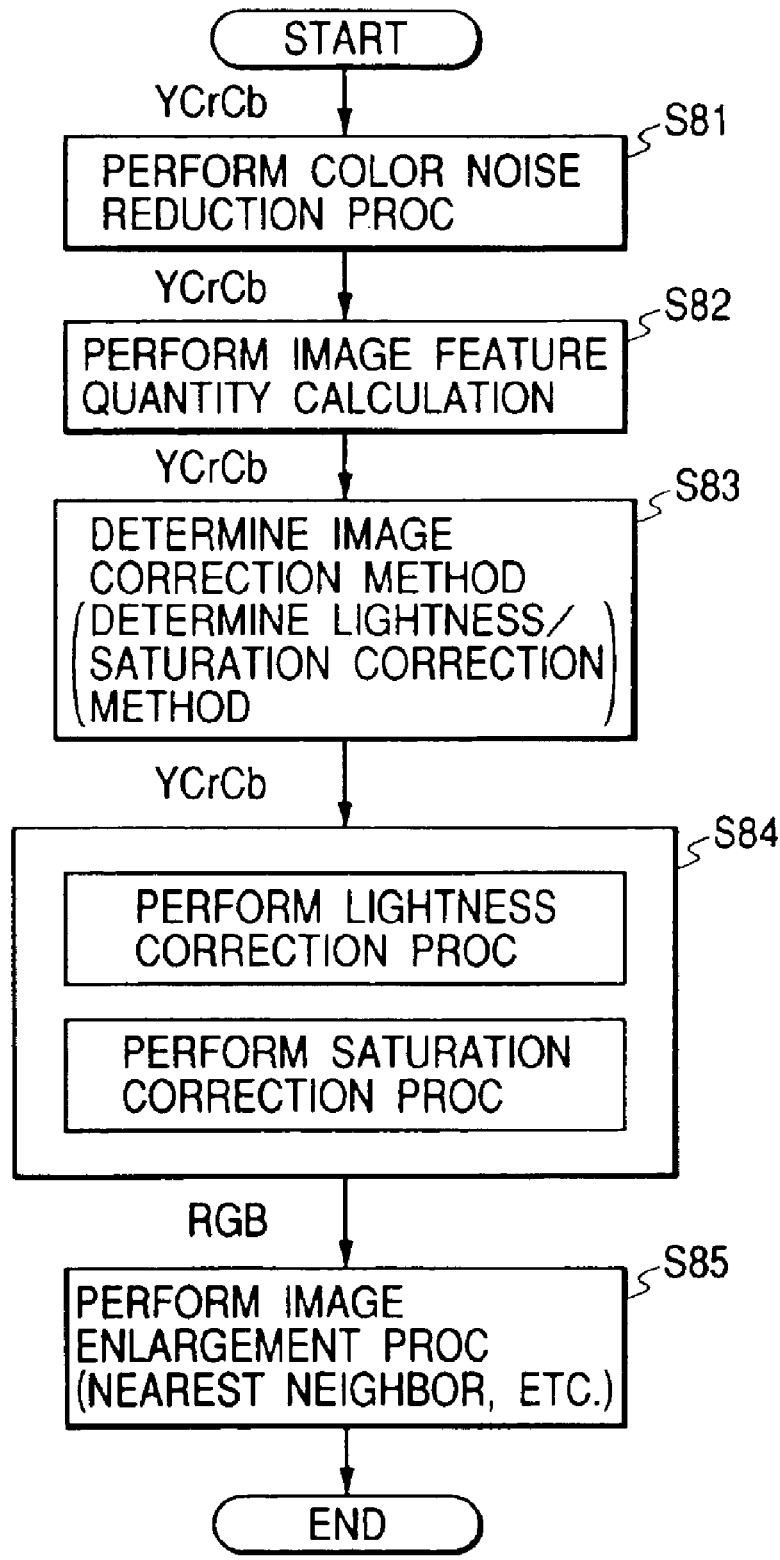
FIG. 17 is a flow chart showing a suitable process procedure for each process in the third embodiment.

The seventh embodiment of the present invention will be explained with reference to FIG. 17. Hereinafter, in order to avoid explanatory complexity, the explanation of the same steps as those in the above embodiments will be omitted, and process procedures will be briefly described. The explanation of steps S73 to S77 in FIG. 16 applies to steps S81–S85, respectively, in FIG. 17.

In the seventh embodiment, when the image correction process is not performed for the non-natural image, it is possible to omit the image feature quantity calculation unit of the step S71 and the natural image judgment unit of the step S72.

For example, when it is possible to previously discriminate the natural image data from the non-natural image data such as the computer graphic or the like on the side of the printer driver 103 shown in FIG. 2, it is possible to omit the above units.

[Other Embodiments]

In the present invention, program codes themselves for causing an apparatus or system connected to various devices to operate them to achieve the functions of the above embodiments, and a means such as a storage medium storing the program codes for supplying the program codes to a computer constitute the present invention.

As the storage medium storing the program codes, for example, a floppy disk, a hard disk, an optical disk, a magnetooptical disk, a CD-ROM, a magnetic tape, a nonvolatile memory card, a ROM, or the like can be used.

It is needless to say that the present invention includes not only the case where the functions of the above embodiments are achieved by executing the supplied program codes with the computer, but also a case where the functions of the above embodiments are achieved by executing the program codes with an OS (operating system) running on the computer or cooperation of the OS and other applications or the like.

Further, it is needless to say that the present invention includes a case where the supplied program codes are once stored in a memory provided in a function expansion board inserted in the computer or a function expansion unit connected to the computer, and then a CPU or the like provided in the function expansion board or the function expansion unit performs all or a part of the actual processes based on instructions of the program codes, whereby the functions of the above embodiments are achieved by such the processes.

Further, it is possible to appropriately combine the above plural embodiments.

Although the present invention has been explained with the preferred embodiments, the present invention is not limited to them. Namely, it is obvious that various modifications and changes are possible in the present invention without departing from the spirit and scope of the appended claims.

What is claimed is:

1. An image process method comprising:
    an input step of inputting color image data composed of a signal representing brightness and a signal representing chrominance;
    a color noise reduction process step of performing a color noise reduction process on the signal representing chrominance, while not changing the signal representing brightness; and
    a first judgment step of judging whether or not the color image data including the signal representing brightness represents an edge part on the basis of the signal representing brightness,
    wherein said color noise reduction process step is not performed, if it is judged in said first judgment step that the color image data represents the edge part.

2. A method according to claim 1, wherein said input step includes a conversion step of converting the color image data composed of plural color component signals into the signal representing brightness and the signal representing chrominance.

3. A method according to claim 1, wherein, if it is judged in said first judgment step that the color image data represents the edge part, an emphasis process is performed to the signal representing brightness.

4. A method according to claim 1, further comprising:
    a second judgment step of judging whether or not the color image data including the signal representing chrominance represents a chrominance change part, on the basis of the signal representing chrominance,
    wherein the smoothing process step is not performed, if it is judged in said second judgment step that the color image data represents the chrominance change part.

5. A method according to claim 1, further comprising:
    a third judgment step of judging whether or not the color image data represents a highlight part,
    wherein the smoothing process step is not performed, if it is judged in said third judgment step that the color image data represents the highlight part.

6. A method according to claim 1, wherein the color noise reduction process of said color noise reduction process step is performed by using a filter symmetrical with respect to a notable pixel in upper and lower directions and right and left directions.

7. A method according to claim 1, wherein the color noise reduction process of said color noise reduction process step is a filtering process which uses peripheral pixels of the input color image data being the notable pixel, and the color image data subjected to the smoothing process is used in a smoothing process for other color image data.

8. A method according to claim 7, wherein the color noise reduction process of said color noised reduction process step is a process which uses a filter having high weight for a pixel area subjected to a smoothing process prior to the notable pixel, and the data is digitally processed.

9. An image process method comprising:
    an input step of inputting a drawing instruction including at least a graphic image data part and a text image data part;
    a detection step of detecting the graphic image data part on the basis of the drawing instruction inputted in said input step; and
    a color noise reduction process step of performing a color noise reduction process on the graphic image data part.

10. A method according to claim 9, wherein the color image data is composed of a signal representing brightness and a signal representing chrominance, and the noise reduction process is a smoothing process which is performed on the signal representing chrominance while not changing the signal representing brightness.

11. A method according to claim 9, wherein, if the graphic image data part is detected in said detection step on the basis of the drawing instruction, the color noise reduction process is not performed.

12. An image process method which performs a filtering process by a filter having a size and shape on a color image, composed of color image data and peripheral color image data, according to the color image data, comprising:
- a detection step of detecting a non-continuous point in the color image by using the color image data and peripheral color image data; and
- a filter change step of changing a filter of a different size and shape in accordance with the detected result in said detection step.

13. A method according to claim 12, wherein the filter used in the filtering process is a filter for referring to a notable line including a notable pixel and lines before the notable line.

14. A method according to claim 12, further comprising:
- a drawing instruction group input step of inputting a group of drawing instructions indicating an output image;
- an image data generation step of generating output image data representing the output image, on the basis of the group of the drawing instructions;
- a division step of dividing the same image on the basis of the plural drawing instructions; and
- a division image input step of inputting the divided plural images.

15. An image process apparatus comprising:
- input means for inputting color image data composed of a signal representing brightness and a signal representing chrominance;
- color noise reduction process means for performing a color noise reduction process on the signal representing chrominance, while holding the signal representing brightness;
- first judgment means for judging whether or not the color image data including the signal representing brightness represents an edge part on the basis of the signal representing brightness,
- wherein said color noise reduction process means does not perform the smoothing process, if it is judged by said first judgment means that the color image data represents the edge part; and
- image formation means for forming an image on the basis of the signal representing brightness and the signal representing chrominance subjected to the color noise reduction process.

16. An image process apparatus comprising:
- input means for inputting a drawing instruction including at least a graphic image data part and a text image data part;
- detection means for detecting the graphic image data part on the basis of the drawing instruction;
- color noise reduction process means for performing a color noise reduction process on the graphic image data part; and
- image formation means for forming an image on the basis of the text image data part and the graphic image data part subject to the color noise reduction process performed by said color noise reduction process means.

17. An image process apparatus which performs a filtering process by a filter having a size and shape to a color image, composed of color image data and peripheral color image data, according to the color image data, comprising:
- detection means for detecting a non-continuous point in the color image by using the color image data and peripheral color image data;
- filter change means for changing a filter of a different size and shape in accordance with the detected result; and
- image formation means for forming an image on the basis of the color image subjected to the filtering process.

18. A computer-readable recording medium which records a program to cause a computer to execute:
- code for an input procedure for inputting color image data composed of a signal representing brightness and a signal representing chrominance;
- code for a color noise reduction process procedure for performing a color noise reduction process on the signal representing chrominance, while holding the signal representing brightness; and
- code for a first judgment step of judging whether or not the color image data including the signal representing brightness represents an edge part on the basis of the signal representing brightness,
- wherein color noise reduction process procedure is not performed, if it is judged in execution of said code for a first judgment step that the color image data represents the edge part.

19. A computer-readable recording medium which records a program to cause a computer to execute:
- code for an input step of inputting a drawing instruction including at least a graphic image data part and a text image data part;
- code for a detection step of detecting the graphic image data part on the basis of the drawing instruction; and
- code for a color noise reduction process step of performing a color noise reduction process on the graphic image data part.

20. A computer-readable recording medium which records a program to cause a computer to execute an image process method for performing a filtering process by a filter having a size and shape to a color image, composed of color image data and peripheral color image data, according to the color image data, comprising to color image data, said program comprising:
- code for a detection step of detecting a non-continuous point in the color image by using the color image data and peripheral color image data; and
- code for a filter change for step of changing a filter of a different size and shape in accordance with the detected result obtained in the detection step.

21. An image process method comprising:
- a calculation step of calculating a feature quantity of an input image composed of input image data by using a histogram concerning brightness;
- a color noise reduction process step of performing a color noise reduction process on the input image data; and
- an image correction step of performing a correction process on the input image subjected to the color noise reduction process in said color noise reduction process step, on the basis of the calculated feature quantity calculated in said calculation step.

22. A method according to claim 21, wherein the input image data includes a component representing brightness and a component representing chrominance, and
wherein, in said color noise reduction process step, a smoothing process is performed on the component representing chrominance.

23. A method according to claim 21, further comprising an enlargement process step of performing an enlargement process on the corrected input image.

24. A method according to claim 21, wherein, in said image correction step, brightness of the input image is corrected.

25. A method according to claim 21, wherein, in said image correction step, saturation of the input image is corrected.

26. A method according to claim 22, wherein, in said image correction step, the component representing brightness and the component representing chrominance are corrected.

27. A method according to claim 21, wherein, in said calculation step, the feature quantity is calculated on the basis of the input image subjected to the color noise reduction process.

28. A method according to claim 21, wherein the color noise reduction process is performed on the basis of a user's manual instruction.

29. An image process method comprising:
a color noise reduction process step of performing a color noise reduction process for input digital image data; and
a scaling step of scaling an image size,
wherein the order of said color noise reduction process step and said scaling step is controlled in accordance with a scaling rate or a scaling method.

30. An image process apparatus comprising:
calculation means for calculating a feature quantity of an input image composed of input image data by using a histogram concerning brightness;
color noise reduction process means for performing a color noise reduction process on the input image data; and
image correction means for performing a correction process on the input image subjected to the color noise reduction process by said color noise reduction process means, on the basis of the calculated feature quantity calculated by said calculation means.

31. An apparatus according to claim 30, further comprising image formation means for forming an image on the basis of the input image data subjected to the correction process.

32. A recording medium which records a computer readable program to realize an image process apparatus comprising:
code for a calculation step of calculating a feature quantity of an input image composed of input image data by using a histogram concerning brightness;
code for a color noise reduction process step of performing a color noise reduction process on the input image data; and
code for an image correction step of performing a correction process on the input image subjected to the color noise reduction process in said color noise reduction process step, on the basis of the calculated feature quantity calculated in said calculation step.

33. An image process method comprising:
a calculation step of calculating a feature quantity of an input image composed of input image data by using a histogram concerning brightness;
a color noise reduction process step of performing a color noise reduction process on the input image data;
an image correction step of performing a correction process on the input image subjected to the color noise reduction process in said color noise reduction process step, on the basis of the calculated feature quantity calculated in said calculation step; and
a scaling step of scaling an image size of the input image,
wherein the order of said scaling step and said color noise reduction process step is controlled in accordance with a scaling rate.

34. An image process method comprising:
a calculation step of calculating a feature quantity of an input image composed of input image data by using a histogram concerning brightness;
a color noise reduction process step of performing a color noise reduction process on the input image data;
an image correction step of performing a correction process on the input image subjected to the color noise reduction process in said color noise reduction process step, on the basis of the calculated feature quantity calculated in said calculation step; and
a reduction step of reducing an image size of the input image,
wherein the order of said reduction step and said color noise reduction process step is controlled in accordance with a reduction method.

35. An image process method comprising:
an input step of inputting color image data composed of a signal representing brightness and a signal representing chrominance;
a color noise reduction process step of performing a color noise reduction process on the signal representing chrominance, while not changing the signal representing brightness;
a first judgment step of judging whether or not the color image data including the signal representing brightness represents an edge part on the basis of the signal representing brightness,
wherein said color noise reduction process step is not performed, if it is judged in said first judgment step that the color image data represents the edge part; and
a third judgment step of judging whether or not the color image data represents a highlight part,
wherein the smoothing process step is not performed, if it is judged in said third judgent step that the color image data represents the highlight part.

36. An image process apparatus comprising:
input means for inputting color image data composed of a signal representing brightness and a signal representing chrominance;
color noise reduction process means for performing a color noise reduction process on the signal representing chrominance, while not changing the signal representing brightness;
first judgment means for judging whether or not the color image data including the signal representing brightness represents an edge part on the basis of the signal representing brightness,
wherein the color noise reduction process step is not performed, if it is judged by said first judgment means that the color image data represents the edge part; and
third judgment means for judging whether or not the color image data represents a highlight part,
wherein the smoothing process step is not performed, if it is judged by said third judgment means that the color image data represents the highlight part.

37. A computer-readable recording medium storing executable code for causing an apparatus to perform an image processing method, said code comprising:
code for an input step of inputting color image data composed of a signal representing brightness and a signal representing chrominance;
code for a color noise reduction process step of performing a color noise reduction process on the signal representing chrominance, while not changing the signal representing brightness;

code for a first judgment step of judging whether or not the color image data including the signal representing brightness represents an edge part on the basis of the signal representing brightness, wherein the color noise reduction process step is not performed, if it is judged in the first judgment step that the color image data represents the edge part; and code for a third judgment step of judging whether or not the color image data represents a highlight part, wherein the smoothing process step is not performed, if it is judged in the third judgment step that the color image data represents the highlight part.

* * * * *

UNITED STATES PATENT AND TRADEMARK OFFICE
CERTIFICATE OF CORRECTION

PATENT NO. : 6,980,326 B2
APPLICATION NO. : 09/734021
DATED : December 27, 2005
INVENTOR(S) : Okinori Tsuchiya et al.

It is certified that error appears in the above-identified patent and that said Letters Patent is hereby corrected as shown below:

ON COVER PAGE AT (56) FOREIGN PATENT DOCUMENTS

"JP     5153608     6/1993" should read --JP     5-153608     6/1993--;
"JP     10200777    7/1998" should read --JP     10-200777    7/1998--; and
"JP     11186937    7/1999" should read --JP     11-186937    7/1999--.

COLUMN 1

Line 23, "extent" should read --the extent--;
Line 24, "provides with" should read --provides--; and
Line 55, "such the" should read --such--.

COLUMN 2

Line 8, "such the" should read --such--;
Line 20, "the gray" should read --gray--;
Line 22, "such the" should read --such--;
Line 32, "following" should read --the following--;
Line 47, "process" should read --processing--;
Line 49, "process" should read --processing--; and
Line 53, "process" should read --processing--.

COLUMN 3

Line 31, "an weight' should read --a weight--;
Line 56, "in case" should read --in a case--; and
Line 58, "case" should read --a case--.

COLUMN 4

Lines 33-34, "computer of AT compatible machine" should read --of the AT compatible type--; and
Lines 36, "thought." should read --contemplated.--.

COLUMN 5

Line 32, "an rapid" should read --a rapid--;
Line 42, "an weight" should read --a weight--; and
Line 63, "such the" should read --such an--.

UNITED STATES PATENT AND TRADEMARK OFFICE
CERTIFICATE OF CORRECTION

PATENT NO. : 6,980,326 B2
APPLICATION NO. : 09/734021
DATED : December 27, 2005
INVENTOR(S) : Okinori Tsuchiya et al.

It is certified that error appears in the above-identified patent and that said Letters Patent is hereby corrected as shown below:

COLUMN 6

Formula (6), "f(i,j) = f (i,j)　　(6)" should read --f(i,j) = $\tilde{f}$(i,j)　　(6)--; and
Line 25, "In case" should read --In the case--.

COLUMN 8

Line 42, "method" should read --methods--;
Line 53, "Such the" should read --Such--;
Line 65, "such the" should read --such--; and "or the" should read --or--.

COLUMN 10

Line 9, "Inkjet" should read --inkjet--.

COLUMN 11

Line 11, "such the" should read --such--;
Line 50, "such the" should read --such--
Line 57, "down ward" should read --downward--;
Line 61, "such the" should read --such--; and
Line 63, "that" should read --so that--.

COLUMN 12

Line 3, "such the" should read --such--;
Line 49, "such the" should read --such--;
Line 60, "such the" should read --such--; "accords to" should read --is appropriate to--; and
Line 64, "of which" should read --whose--.

COLUMN 15

Line 35, "increases" should read --increase--; and
Line 36, "such" should be deleted.

COLUMN 18

Line 42, "noised" should read --noise--.

UNITED STATES PATENT AND TRADEMARK OFFICE
CERTIFICATE OF CORRECTION

PATENT NO. : 6,980,326 B2
APPLICATION NO. : 09/734021
DATED : December 27, 2005
INVENTOR(S) : Okinori Tsuchiya et al.

It is certified that error appears in the above-identified patent and that said Letters Patent is hereby corrected as shown below:

COLUMN 20

Lines 36-37, "comprising to color image data, said program comprising:" should read --said program comprising:--; and
Line 41, "for step" should read --for a step--.

COLUMN 22

Line 36, "judgent" should read --judgment--.

Signed and Sealed this

Seventeenth Day of October, 2006

JON W. DUDAS
*Director of the United States Patent and Trademark Office*